United States Patent
Tada et al.

(10) Patent No.: US 6,662,105 B1
(45) Date of Patent: Dec. 9, 2003

(54) NAVIGATION DEVICE AND METHOD OF USE HAVING TWO SEPARATE ROUTE SEARCHING DEVICES

(75) Inventors: Akihito Tada, Toyota (JP); Hironobu Sugimoto, Toyota (JP); Masayuki Yurimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 42 days.

(21) Appl. No.: 09/705,711

(22) Filed: Nov. 6, 2000

(30) Foreign Application Priority Data

Nov. 18, 1999 (JP) .......................................... 11-328430

(51) Int. Cl.[7] .............................................. G01C 21/30
(52) U.S. Cl. ..................... 701/209; 701/208; 701/211; 340/990; 340/995.13; 340/995.19; 340/995.23; 342/457; 342/357.13
(58) Field of Search ................................. 701/207, 208, 701/209, 210, 23, 213, 25, 26, 211, 214; 340/988, 990, 995, 995.1, 995.13, 995.19, 995.23, 995.12, 995.24; 73/178 R; 342/457, 357.13, 357.09

(56) References Cited

U.S. PATENT DOCUMENTS

| 5,243,528 A | | 9/1993 | Lefebvre ..................... 701/210 |
|---|---|---|---|
| 5,875,412 A | * | 2/1999 | Sulich et al. ................ 701/210 |
| 6,052,645 A | * | 4/2000 | Harada ......................... 340/990 |
| 6,070,123 A | * | 5/2000 | Beyer et al. .................. 701/209 |
| 6,098,016 A | * | 8/2000 | Ishihara ....................... 701/209 |
| 6,154,152 A | * | 11/2000 | Ito .............................. 340/988 |
| 6,163,298 A | * | 12/2000 | Ishihara ....................... 342/457 |
| 6,178,377 B1 | * | 1/2001 | Ishihara et al. ............. 340/995 |
| 6,202,024 B1 | * | 3/2001 | Yokoyama et al. ......... 701/200 |
| 6,263,276 B1 | * | 7/2001 | Yokoyama et al. ......... 340/988 |
| 6,278,941 B1 | * | 8/2001 | Yokoyama ................... 701/209 |
| 6,282,492 B1 | * | 8/2001 | Gorai et al. ................. 701/209 |
| 6,338,020 B2 | * | 1/2002 | Hashimoto ................... 340/988 |
| 6,427,117 B1 | * | 7/2002 | Ito et al. ...................... 701/209 |

FOREIGN PATENT DOCUMENTS

| JP | A-9-178499 | | 7/1997 | |
|---|---|---|---|---|
| JP | 10232137 A | * | 9/1998 | ............ B60R/16/02 |
| JP | 11295096 | | 10/1999 | |
| JP | 2000055682 A | * | 2/2000 | ............ G01C/21/00 |
| JP | 2000149193 A | * | 5/2000 | ............ G08G/1/133 |
| WO | 99/09374 | | 2/1999 | |

* cited by examiner

Primary Examiner—Jacques H. Louis-Jacques
(74) Attorney, Agent, or Firm—Oliff & Berridge, PLC

(57) ABSTRACT

A route search location determining section (12d) of a mobile body (10) decides whether to conduct a route search at the mobile body (10) or to request the route search to an information center (30) based on various conditions such as priorities and how old the map data version is. In this manner, effective search can be conducted using two distinct route searching devices. Also, a current position calculating section (12a) can execute map matching by adding route data obtained from the information center (30) as a map matching candidate.

25 Claims, 21 Drawing Sheets

NAVIGATION DEVICE AND METHOD OF USE HAVING TWO SEPARATE ROUTE SEARCHING DEVICES

BACKGROUND OF THE INVENTION

1. Field of the Invention

The present invention relates to a navigation device mounted on a mobile body for executing route guidance, and in particular to a navigation device which can obtain route data from an outside information center.

2. Description of the Related Art

A navigation device is known for executing route guidance in a vehicle. The navigation device includes a current position detecting section such as a GPS device and a map database. The navigation device recognizes the current position of the vehicle on a map and displays this information on a display. The navigation device also searches, upon inputting a destination, the best route from the current position to the destination. Moreover, if the route is set while the vehicle is traveling, the navigation device gives guidance such as turning right or left at an intersection, in addition to displaying the route on the display.

Some of the navigation devices communicate with an outside information center to obtain information such as congestion information. Furthermore, a system is being proposed in which the navigation device communicate with an outside information center to request a route search and obtains the search result.

By using the outside information center as described above, the navigation device can execute route guidance based on more precise road information.

In the navigation device, the current position detected by the current position detecting device such as the GPS device and the data for road positions in the map data are not particularly precise. Because of this, when the detected current position is marked on a map display based on the map data, there are cases where the display is not accurate.

The vehicle, on the other hand, usually travels on a road. This allows for a process called map matching, in which the trajectory of the current positions is compared with the map data to compensate the position of the vehicle on the map. In this manner, the current position can be moved onto a road and can be accurately displayed.

As described above, by requesting a route search to the information center, a more precise route search result can be obtained. However, in order to communicate with the information center, lines such as a telephone line must be used, and thus, the operation involves some communication cost. Moreover, there are cases where the information center applies fees to its service. Therefore, a cost is incurred for requesting a route search to the information center. In addition, because the mobile body communication usually uses wireless communication, there are cases where sufficient communication cannot be achieved due to the receiving environment for the electric wave.

The map matching is performed with an assumption that the map data is correct. However, road construction is continuously being performed, and when the map data becomes old, the vehicle may travel on a road that is not present in the map data. In such a case, the map matching cannot be correctly performed, resulting in failure to detect the current position.

SUMMARY OF THE INVENTION

One of the objects of the present invention is to provide a navigation device which takes advantage of a route search by an information center and which can improve the precision of a map matching process.

According to one aspect of the present invention, there is provided a navigation device mounted on a mobile body for executing route guidance, the navigation device comprising a mobile body route searching device for conducting route search using a map database maintained at the device to obtain route guiding data, an information center route searching device for obtaining route guiding data from an information center using wireless communication, and a search selecting device for determining whether to use the mobile body route searching device or the information center route searching device. In this manner, according to the present invention, a search selecting device is included for allowing selection of the searching device. A suitable searching device can be selected according to various conditions to obtain an accurate route search result while maintaining a suitable communications cost and responsiveness.

It is preferable that the search selecting device selects whether to use the mobile body route searching device or the information center route searching device based on the condition of the optimal route at the route search. For search selection, there are many conditions such as whether search should be conducted with higher priority on highways or on the distance. There are cases where the decision as to whether the mobile body or the information center is more suitable for search can be determined from particular conditions. By considering these conditions for route search, a suitable search device can be selected.

It is also preferable that the route is searched on a plurality of conditions for an optimal route and the search selecting device determines the route searching device for each of the plurality of conditions. By searching on a plurality of conditions, the user can be notified of the optimal route for each condition, and can select the route set from these conditions. By determining the searching device considering factors such as the search load, all the search result can be quickly obtained.

It is also preferable that the route search includes at least a peripheral route search for returning to a set route when off-route, in addition to a complete route search for searching routes to the destination, and the search selecting device determines the route selecting device based on the type of search. The peripheral search may be conducted many times in the case of going off-route or the like. If the search is requested to the information center for each peripheral search, it is likely that the cost will be increased. Moreover it is usually true that the peripheral search needs a quick result, and thus, search at the mobile body is desirable because search can be quickly conducted without spending time to establish a line. Therefore, it is preferable to determine the searching device based on the type of search.

It is also preferable that the search selecting device determines the route selecting device to be used based on the version of the map data in the map database maintained at the navigation device. If the version at the information center is more recent than the version at the mobile body, it is unlikely that the map database at the mobile body will hold accurate road data. Because of this, it is preferable to decide whether or not to request search to the information center considering the version.

It is also preferable that the search selecting device determines a route searching device to be used based on the date when the map data is generated, in the map database maintained at the navigation device. If the date of generating the map is not recent, reliability of the map is decreased and it is thus preferable to select a searching device considering the date when the data was generated.

It is also preferable that the search selecting device divides the route search into two portions, one with the distance to the destination large and the other with the distance to the destination small, and selects the route searching device. It is usually the case that a search result for roads near the current position is needed quickly and that the device should not establish communication. It is also true that the congestion information etc., near the current position can be sufficiently obtained at the mobile body. Therefore, the search for the roads near the current position can often be performed by the mobile body. By considering this point, a suitable searching device can be selected.

It is also preferable that the route selecting device decides the route searching device to be used using operation schedule information of the information center. When the information center is not operated, a search cannot be requested. Therefore, by not communicating in such a case, ineffective communication can be avoided.

It is also preferable that the search selecting device decides route searching location based on the receiving conditions for an electric wave. When the receiving condition for the electric wave is not good, it is probable that the communication with the information center cannot be performed well and there are cases where the search result cannot be obtained. Such ineffective processing can be avoided.

It is also preferable that the search selecting device predicts a time period where the communication can be performed, based on the information on the areas where communication with the information center is possible and the travel condition of the mobile body, and decides a route searching device to be used considering the predicted time period. Even when the navigation device can currently communicate, there are cases where the vehicle runs out of the area where communication is possible before obtaining the search result. Thus, such a possibility can be predicted, and when the probability is high for the vehicle to run out of the area, execution of ineffective processing can be avoided by not requesting a search to the information center.

It is also preferable that the route selecting device decides a route searching device to be used considering the usage condition of the communication with the information center. When the communication section is used for other communications, there are cases where communication with the information center is not possible. By not trying to communicate in such a case, generation of delay by ineffective processing can be avoided.

It is also preferable that the search selecting device decides route searching device considering the past movement history of the mobile body. For example, a user usually has sufficient knowledge on a road if the user has used that road a number of times in the past, and in such a case, it is usually sufficient to use a route search result from the mobile body. By considering the past history, a suitable route searching device can be selected.

It is also preferable that the navigation device further includes a point memory for pre-storing destination candidates and that the search selecting device selects a route searching device considering the destination candidates stored in the point memory. A point stored in the point memory is usually a point the user knows well. Thus, it is usually the case that route search at the mobile body is sufficient for the areas around that point. Therefore, by considering the content in the point memory, a suitable searching device can be selected.

It is also preferable that the search selecting device selects a route searching device considering the communications cost in a predetermined period in the past. Some users wish to set an upper limit to the communications cost. It is thus preferable that an upper limit to the communications cost is set and the selecting device decides whether to request a search to the information center based on a condition indicating whether the upper limit is exceeded. It is preferable that the communications cost includes various service fees at the information center.

It is also preferable that the navigation device includes a display device for displaying the search result, and that the search selecting device selects both mobile body and information center route searching devices to overlap display of the search results from both searching devices.

According to another aspect of the present invention, there is provided a navigation device mounted on a mobile body for executing route guidance, the navigation device comprising a position detecting device for detecting the position of the mobile body, a center route data obtaining device for obtaining route data from an information center using wireless communication, and a map matching device for comparing the detected position of the mobile body with the route data obtained from the information center to compensate the position of the mobile body. The map data at the information center is usually updated to the most recent one. The map data at the mobile body, on the other hand, is not updated to the most recent one. Because of this, there are cases where a new road is included in the route data provided from the information center. In the current position detection at the mobile body, while on the other hand, map matching is performed to draw the current position onto a road. Therefore, if the mobile body obtains a route which includes a new road from the information center and travels along the route, there can be cases where the mobile body travels on a road which is not present in the map data at the mobile body. In such a case, the navigation device will judged as off-route, and no accurate correction to the current position can be obtained. By using the route data from the information center for the map marching, off-route can be prevented and suitable map matching process can be performed.

It is preferable that the map matching device adds route data from the information center as a map matching candidate for map matching at the map data maintained by the mobile body and performs the map matching process. By adding the route data from the information center as a candidate, map matching can be performed without a problem even when the mobile body travels off the route.

It is also preferable that the map matching device compares the route data obtained from the information center with the map data maintained at the mobile body terminal, and when the route data overlap on a road, the map matching device uses only the map data maintained at the mobile body terminal to perform map matching. By not adding a candidate for the overlapped section, processing load can be reduced.

It is also preferable that the map matching device performs map matching using the map data maintained at the mobile body for normal situations, and performs map matching by adding guide route data obtained from the information center as a matching candidate when the detected position of the mobile body is off the roads in the map data. By adding the route data as a candidate only when the mobile body is off-route, the route data can be considered only when necessary, allowing for execution of a suitable map matching process.

It is also preferable that the map matching device considers the version of the map data maintained at the mobile body terminal when judging whether or not to include the route data obtained from the information center as a map matching candidate. When the version is old, it is unlikely that new road data are included, and thus, by considering this, a map matching candidate can be suitably added.

It is also preferable that the map matching device considers the date when the map data maintained at the mobile body terminal is generated, when judging whether or not to add the route data obtained from the information center as a map matching candidate. When the generation date is old, it is unlikely that new road data are included, and thus, by considering this, a map matching candidate can be suitably added.

It is also preferable that the map matching device decides whether or not to add the route data obtained from the information center as a candidate based on the past travel history on the sections where the route data and map data maintained at the mobile body terminal do not overlap.

It is also preferable that the map matching device decides whether or not to add the route data as a map matching candidate considering the travel history for cases when route data is obtained. From the history of the user on whether or not they travel along the route, it can be judged whether or not the route data from the information center should be added as a map matching candidate. For example, for users who do not follow the route, adding a route as a candidate is less important.

It is also preferable that the map matching device changes weights for the roads on the map data and for the route data when executing map matching with the route data added as a map matching candidate. By changing the weights, a suitable map matching can be constantly executed. For example, assigning zero as the weight would mean that the route which was once added is substantially removed from the map matching candidates.

According to another aspect of the present invention, there is provided a route guiding method wherein a route is guided using the route guiding data obtained from a route search using a map database maintained at a mobile body and/or a route guiding data obtained from an information center using wireless communication.

According to another aspect of the present invention, there is provided a method for compensating a position of a mobile body comprising the step of comparing a position of the mobile body detected at the mobile body and route data obtained from an information center using wireless communication.

DESCRIPTION OF PREFERRED EMBODIMENT

Figure 1:
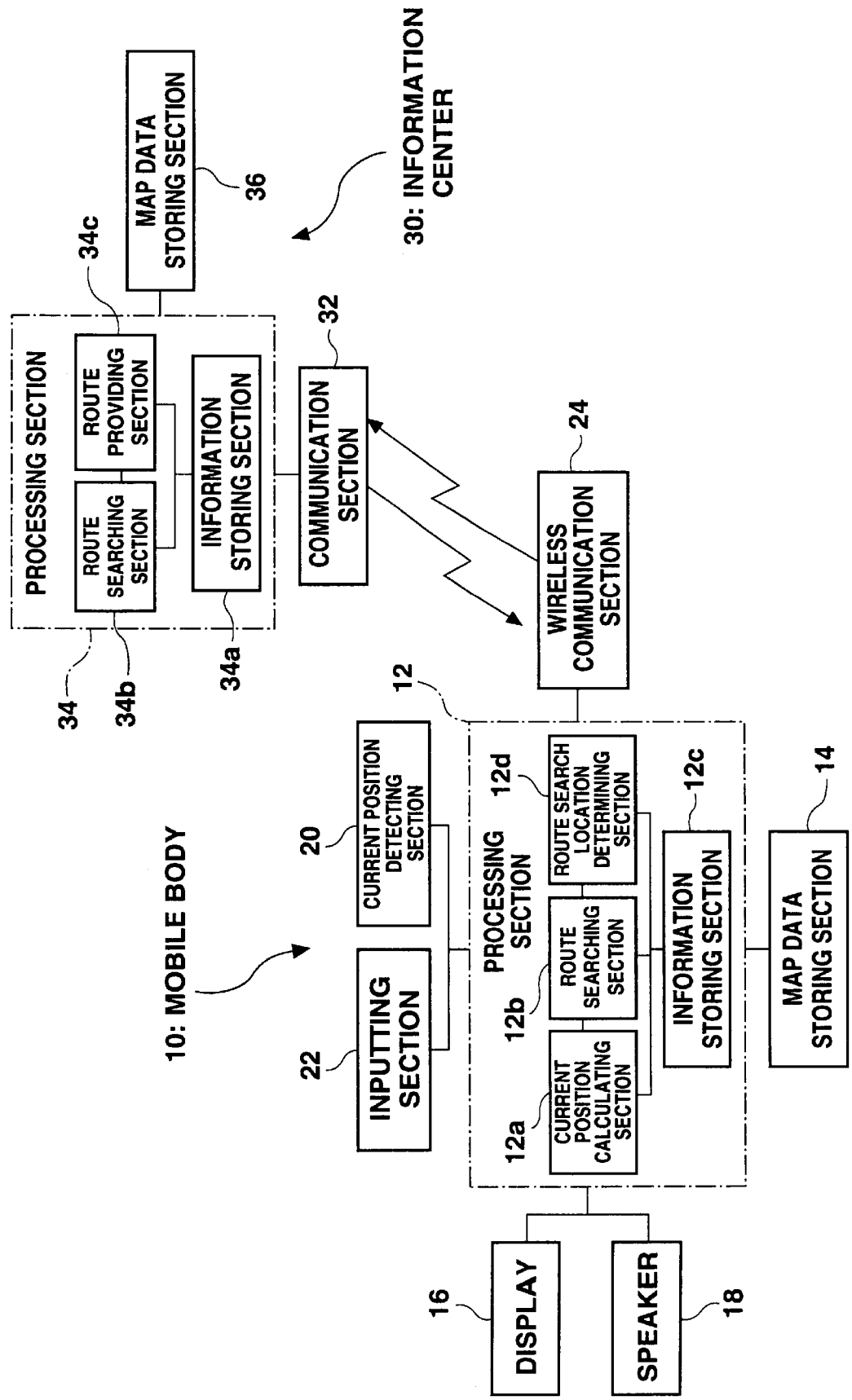
FIG. 1 is a diagram showing an overall structure of a system according to the present invention.

The entire disclosure of Japanese application No. Hei 11-328430 filed on Nov. 18, 1999 including specification, claims, drawings and summary are incorporated herein be reference in its entirety.

The preferred embodiments of the present invention will now be described referring to the drawings.

First Embodiment

FIG. 1 is a diagram showing an overall structure of a system according to a first embodiment. A processing section 12 constructed from a computer is provided on a mobile body (vehicle) 10. A map data storing section 14 comprising storing medium such as a DVD is connected to the processing section 12. Map data is read from the map data storing section 14 and used by the processing section 12 when necessary. A display 16 such as an LCD (liquid crystal display) and a speaker 18 are connected to the processing section 12 for displaying route guidance on the display 16 and outputting a guiding voice from the speaker 18.

A current position detecting section 20 such as a GPS device is connected to the processing section 12. A current position calculating section 12a within the processing section 12 receives a signal from the current position detecting section 20, compares the signal with the map data from the map data storing section 14, and recognizes the current position of the vehicle as a position on the map. During this process, the current position calculating section 12a executes a map matching process. In other words, the position calculating section 12a compensates the detected current position to a more probable position on a road by comparing the trajectory of the past current positions and road geometry. The detected current position is then stored in an information storing section 12c. Moreover, the detected current position is displayed on a map on the display 16.

An inputting section 22 is connected to the processing section 12 for inputting various information. It is preferable to form the inputting section 22 by a touch panel or the like provided on the front side of the display 16. In this manner, inputting a destination by touching a point on the displayed map can be enabled, or by providing various buttons, the user can be allowed to input various data by touching a button. These input information are stored in the information storing section 12c. Other information such as the vehicle speed are input to the processing section 12 and stored in the information storing section 12c.

A wireless communication section 24 is connected to the processing section 12 and the device communicates with an outside information center 30 using the wireless communication section 24. The communication is communication using, for example, a telephone line. The processing section 12 uses a telephone mounted in the mobile body 10 to wirelessly communicate with a base station connected to the information center 30 via a phone line network. The communication is not limited to the telephone line, and it is possible, for example, for the mobile body 10 and information center 30 to directly communicate wirelessly, or to communicate using a satellite channel or a light beacon or an electric wave beacon.

The processing section 12 also includes a route searching section 12b, and when a destination is set by the inputting section 22, the route searching section 12b searches a route from the current position to the destination.

The information storing section 12c of the processing section 12 also stores various input information, including route type information such as user off-route frequency history, user position information, user movement history, and information on whether or not the mobile body is on a highway, search type information such as user movement speed, user point memory information, electric wave condition information for wireless communication, congestion information, user communications cost history information, area information where wireless communication is possible, user destination information, road type information where the user has moved, map data version, date when the map data is generated, information on a schedule for center operation, and information on whether or not the search is for a complete route, and information obtained at the vehicle side or from the information center such as the date when the map data is generated at the information center and the version for the center map data. These items of information are used for route search at the route searching section 12b, and also for deciding the location for processing the route search at a route search location deciding section 12d.

In other words, a route search location deciding section 12d is provided within the processing section 12 and decides either to conduct a route search at the processing section 12 or to request the route search to the outside information center 30 based on the information stored in the information storing section 12c.

The information center 30 includes a communication section 32 and communicates with the wireless communication section 24 on the mobile body 10. When the phone line is used as described above, the communication section 32 is connected to a phone line network.

The communication section 32 is connected to a processing section 34 constructed from a computer with a high capability. The processing section 34 executes processes at the center such as the route search. A map data storing section 36 is connected to the processing section 34. The map data storing section 36 always maintains the most recent and updated map data. The map data storing section 36 also contains information which changes with time such as congestion information.

An information storing section 34a is provided within the processing section 34 in which various items of information are stored, including user information such as user position information provided by a user and user destination information, and center side information such as the date when the map stored in the map data storing section 36 is generated, version of the map, and the center operation schedule information. A route searching section 34b is provided in the processing section 34 for conducting route search using map data in the map data storing section 36, and user position and destination stored in the information storing section 34a. Transportation information such as the congestion information can be stored in the information storing section 34a. Moreover, a route providing section 34c is provided on the processing section 34 and route information obtained by the search is provided by the route providing section 34c to the mobile body 10 via the communication section 32.

In such a system, when a user (for example, the driver of the vehicle) wishes to conduct a route search, the user inputs the destination by manipulating on the inputting section 22 and directs a route search to the processing section 12.

At this point, the route search location deciding section 12d within the processing section 12 decides whether to conduct the route search at the mobile body 10 or to request to the information center 30 using wireless communication. According to the decision of the route search location deciding section 12d, a route is searched at the mobile body 10 and/or at the information center 30. When the searched route is set as the route to the destination, the route is displayed on the display 16 and route guiding is executed. For example, the route is displayed with a different color on the road map display. When the vehicle approaches a cross section where a right or left turn is to be taken, the turn direction from the cross section is enlarged and displayed. In addition, a guiding voice is output from the speaker 18 for the right or left turn.

The route search location decision at the route search location deciding section 12d, which is a characteristic of the embodiment, will now be explained in further detail.

Example 1-1

Figure 2:
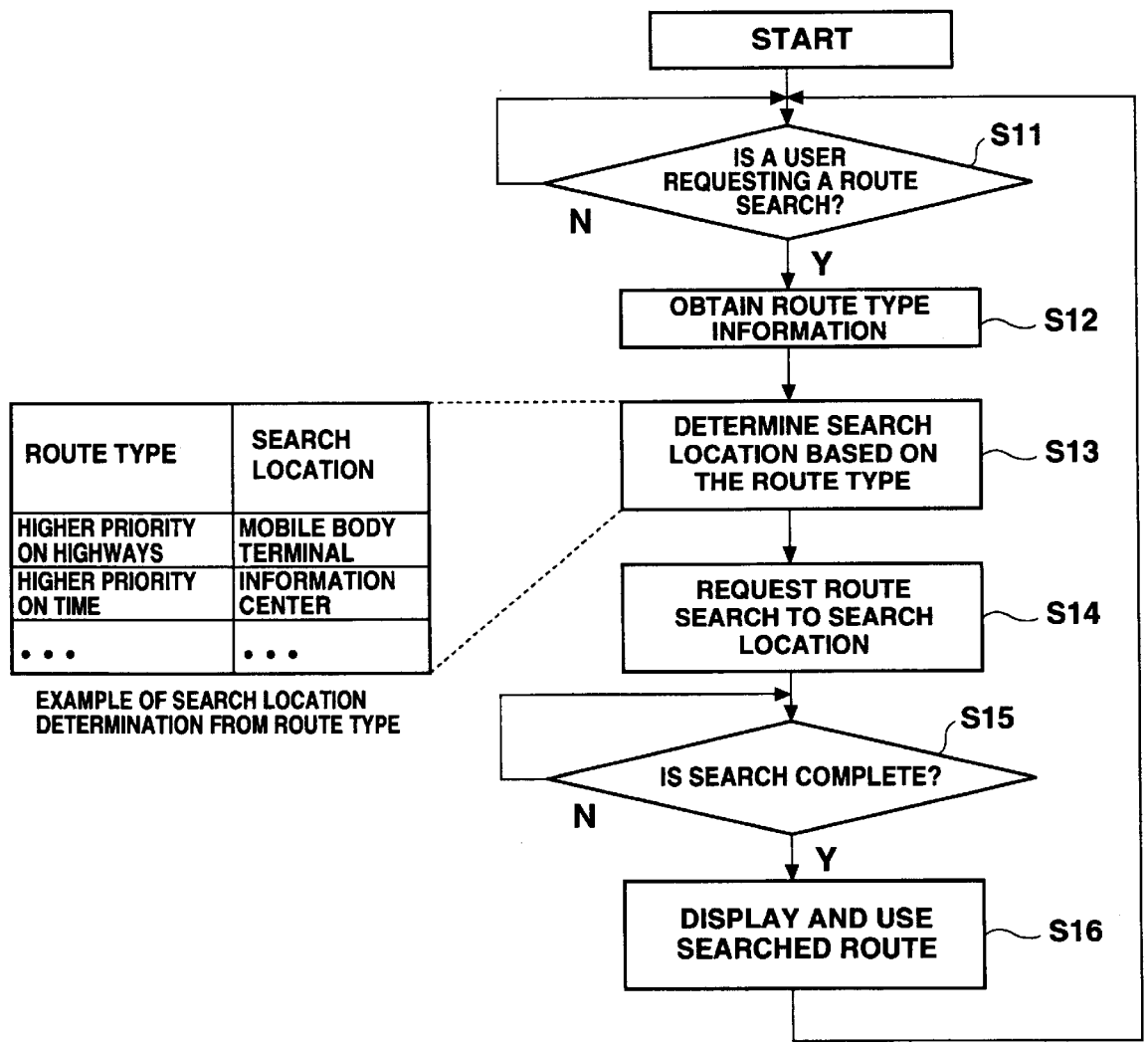
FIG. 2 is a flowchart showing the operation in an example 1-1 of a first embodiment.

FIG. 2 is a flowchart showing an operation of the route search location deciding section 12d according to an example 1-1. In this example, the search location is determined based on the route type.

First, it is judged if there is a route search request from a user (step S11). When there is such a request, route type information is obtained (step S12). The route type information is information indicating a condition for route search such as whether to set higher priority to the highway, to the normal road, or to the travel time (shortest time), and whether to set higher priority to the distance (shortest distance) or to the cost (smallest travel expense). The route type is determined by, for example, a user input.

The search location is then determined based on the obtained route type (step S13). For example, information on the highway is usually correct even from the information on the mobile body, and thus, the route search for using the highway is conducted at the mobile body. For routes with higher priority on the time, on the other hand, it is usually better to search the routes at the information center which holds the most recent road information, and thus, the route search is conducted at the information center 30.

Based on the search location decision, a route search is requested to the information center 30 or to the route searching section 12b at the mobile body 10 (step S14). When the search is completed (step S15), the search result is obtained and displayed on the display 16 and guidance is executed using the obtained search result (step S16).

In this manner, from the type of route to be searched (such as priority on the highways or on the cost), the route search location (such as mobile body terminal and information center) is decided. By using such a configuration, the time and cost for wireless communication can be reduced while searching a route using the most recent road data when necessary.

Example 1-2

Figure 3:
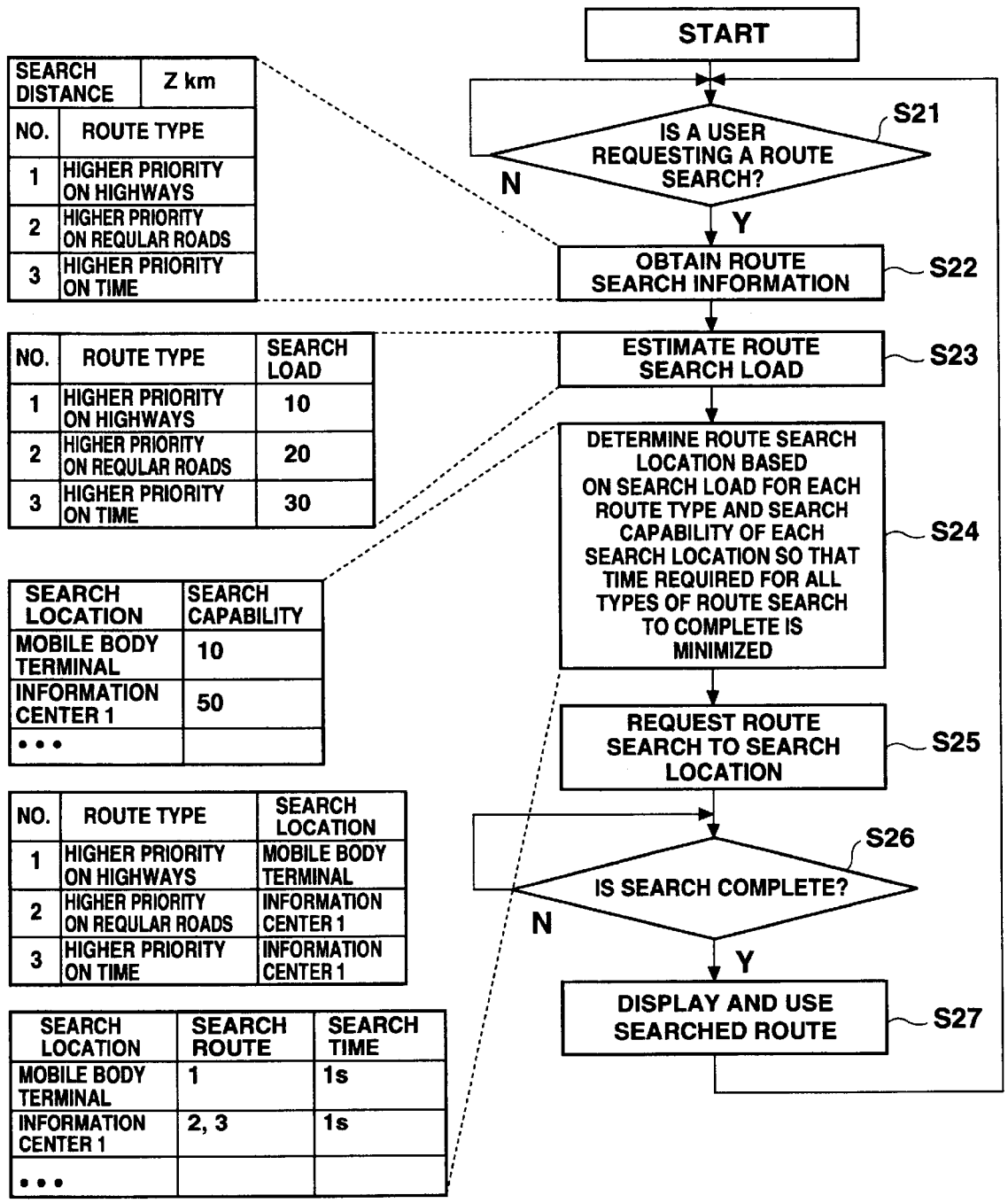
FIG. 3 is a flowchart showing the operation in an example 1-2 of a first embodiment.

FIG. 3 is a flowchart showing an operation of the route search location deciding section 12d in an example 1-2. In this example, when a plurality of routes are simultaneously searched, search location for each route is separately determined based on the route type.

First, it is judged whether there is a route search request from a user (step S21). Then, when there is such a request, route type information is obtained as route search information (step S22). The route type is similar to the above example, and is information such as whether to set higher priority to the highways. In this example, a plurality of searches for a plurality of route types are conducted in parallel according to, for example, the user setting. Then, route search loads for each of the search based on a plurality of route types are estimated (step S23). For example, the load for the route search can be obtained by pre-storing numbers such as 10 for priority on the highway, 20 for priority on the normal road, and 30 for priority on time, or by calculation considering the condition such as the amount of congestion information.

Next, route search location is decided so that the time required for the route search of all types is minimized, based on the search load for each route type and the capability of the search location (step S24). In this example, it is presumed that a plurality of information centers 30 can be used and the information center 30 can also be assigned, but it is also possible to limit the number of information centers 30 to be connected to one. For example, a number 10 can be set as the search capability of the mobile body 10 and 50 as the search capability of the information center 30. In this case, the mobile body only conducts the route search for the "higher priority to the highway" type and request from the information center the "higher priority to the normal road" and "higher priority to time" types. In this example, even when two types of route search are conducted at the information center, the required time would still be one second. Because the time required at the mobile body to search for the route which has higher priority on the highway is also one second, all three routes can be obtained after one second.

Based on the search location decision, route search is requested either to the information center 30 or to the route search section 12b of the mobile body 10 (step S25). When the search is completed (step S26), the search result is obtained and displayed on the display 16, and guidance using the obtained result is executed (step S27).

Figure 22:
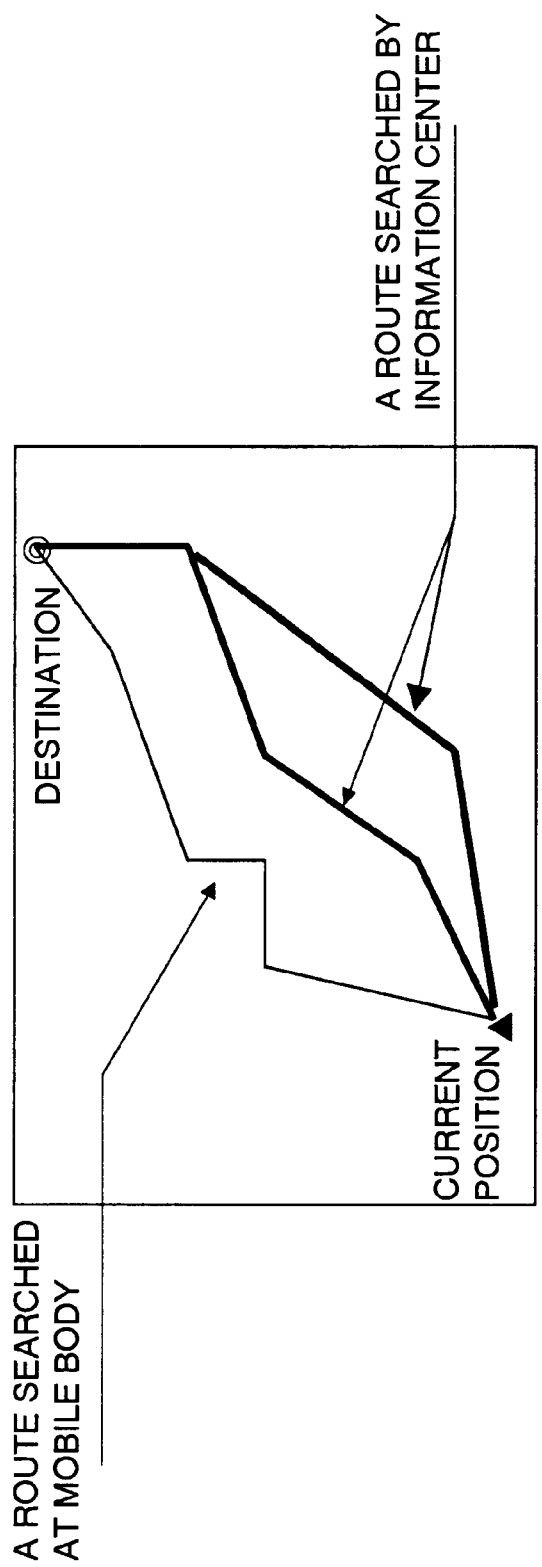
FIG. 22 is a diagram showing an example of a display for searched routes.

FIG. 22 shows one example of displaying the search result on the display. As shown, a plurality of search results obtained at a plurality of search locations can be simultaneously confirmed on one screen, and thus, the user can use the system without recognizing the plurality of search location. Each of the search results can be differentiated by changing the width of the route or by changing the color, etc., and the user can select an arbitrary route and route guidance can be executed.

In this manner, when a plurality of routes are searched, by deciding the route searching location from the route type, the route search response time can be shortened.

Example 1-3

Figure 4:
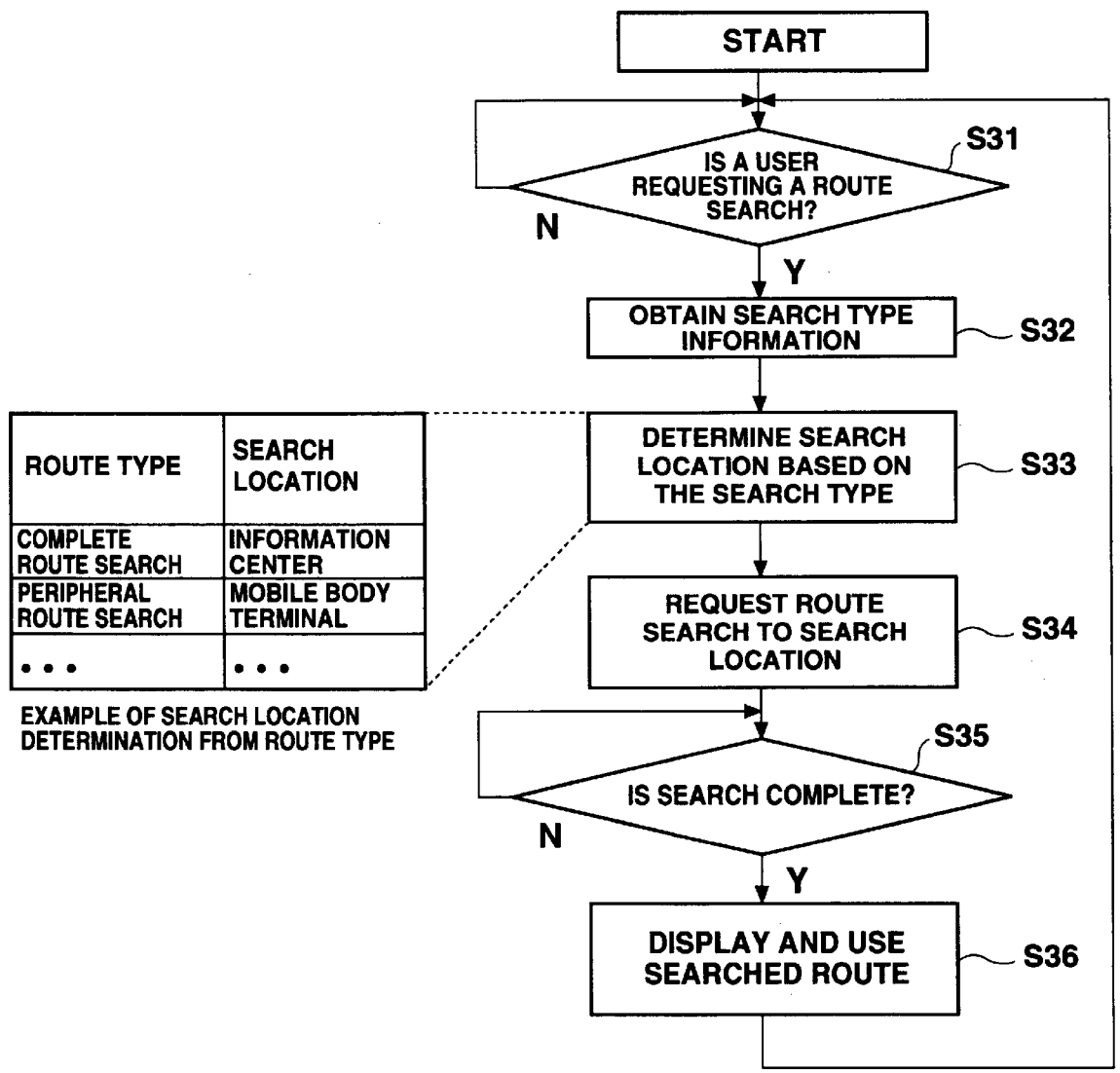
FIG. 4 is a flowchart showing the operation in an example 1-3 of a first embodiment.

FIG. 4 is a flowchart showing an operation of the route search location deciding section 12d in an example 1-3. In this example, the route search location is decided from the search type (such as, for example, complete route search or peripheral route search).

First, it is judged if there is a route search request from a user (step S31). When there is such a request, the search type information is obtained (step S32). The search type information is information such as whether the search to be conducted is a complete route search for searching route to the destination or a peripheral route search for returning to the route when off-route. Based on the search type, the search location is determined (step S33). In this example, the complete route search is requested to the information center 30 and the peripheral route search is conducted at the mobile body 10. This is because while the complete route search requires more accurate route search using the most recent road data, the peripheral search is for a relatively short distance and requires a good response when off-route. Moreover, it is more probable that the peripheral route search is repeated, and thus, it is usually suitable to conduct the peripheral search at the mobile body from the view point of the cost.

Based on the search location decision, route search is requested either to the information center or to the route searching section 12b of the mobile body 10 (step S34). When the search is completed (step S35), the search result is obtained and displayed on the display 16, and guidance using the search result is executed (S36).

In this manner, by deciding the route search location from the search type (such as complete route search and peripheral route search), route search can be conducted using the most recent road data, the route search response time can be shortened, and time and cost for the wireless communication can be reduced.

Example 1-4

Figure 5:
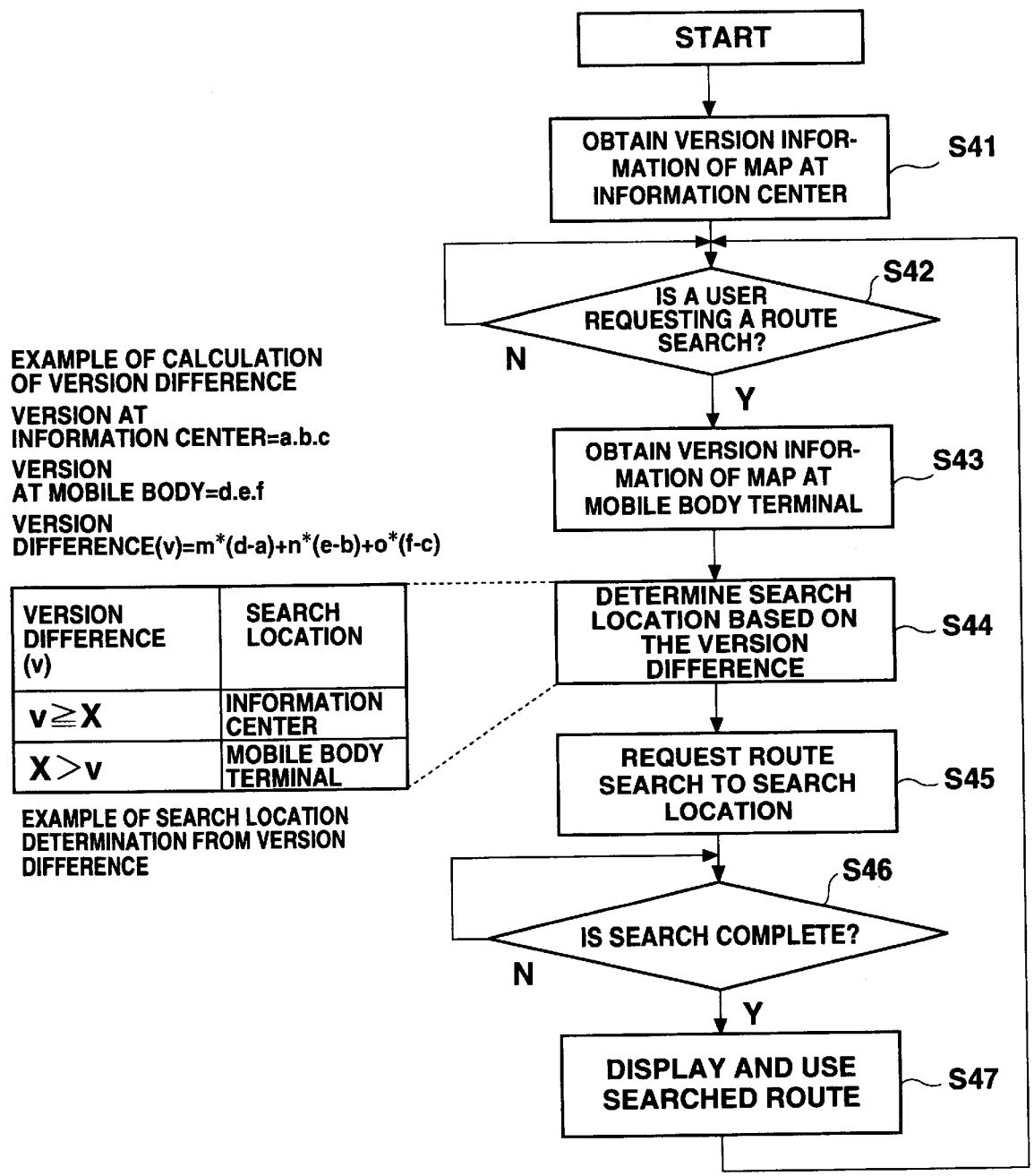
FIG. 5 is a flowchart showing the operation in an example 1-4 of a first embodiment.

FIG. 5 is a flowchart showing an operation of the route search location deciding section 12d in an example 1-4. In this example, the route searching location is decided from the version of the map data maintained at the mobile body terminal.

First, the version information of the map at the information center is obtained from the information in the information storing section 12c (step S41). The information is periodically obtained and stored in the information storing section 12c upon connecting to the information center 30. It is judged whether route search is requested from a user (step S42), and when there is such a request, the version information of the map at the mobile body terminal is obtained (step S43).

The search location is then decided based on the version difference between the information center 30 and the mobile body 10 (step S44). In this example, if the version at the information center 30 is a.b.c and the version at the mobile body 10 is d.e.f, a version difference v is calculated from an equation, v=m * (d−a)+n * (e−b )+o * (f−c). when the version difference v is larger than a preset threshold value X, the search is requested to the information center 30, otherwise the mobile body 10 conducts the search. The version information is divided into three portions because the first number is changed when a major modification is made, the second number is changed when a medium modification is made, and the third number is changed when a minor modification is made. The numbers m, n, and o represent weights which are determined based on the extent of these modifications.

Based on the search location decision, route search is requested either from the information center 30 or to the route searching section 12b of the mobile body 10 (step S45). When the search is completed (step S46), the search result is obtained and displayed on the display 16, and guidance using the obtained result is executed (step S47).

In this manner, by deciding the route search location from the version of the map data maintained at the mobile body terminal, the time and cost for the wireless communication can be reduced while searching a route using the most recent road data.

Example 1-5

Figure 6:
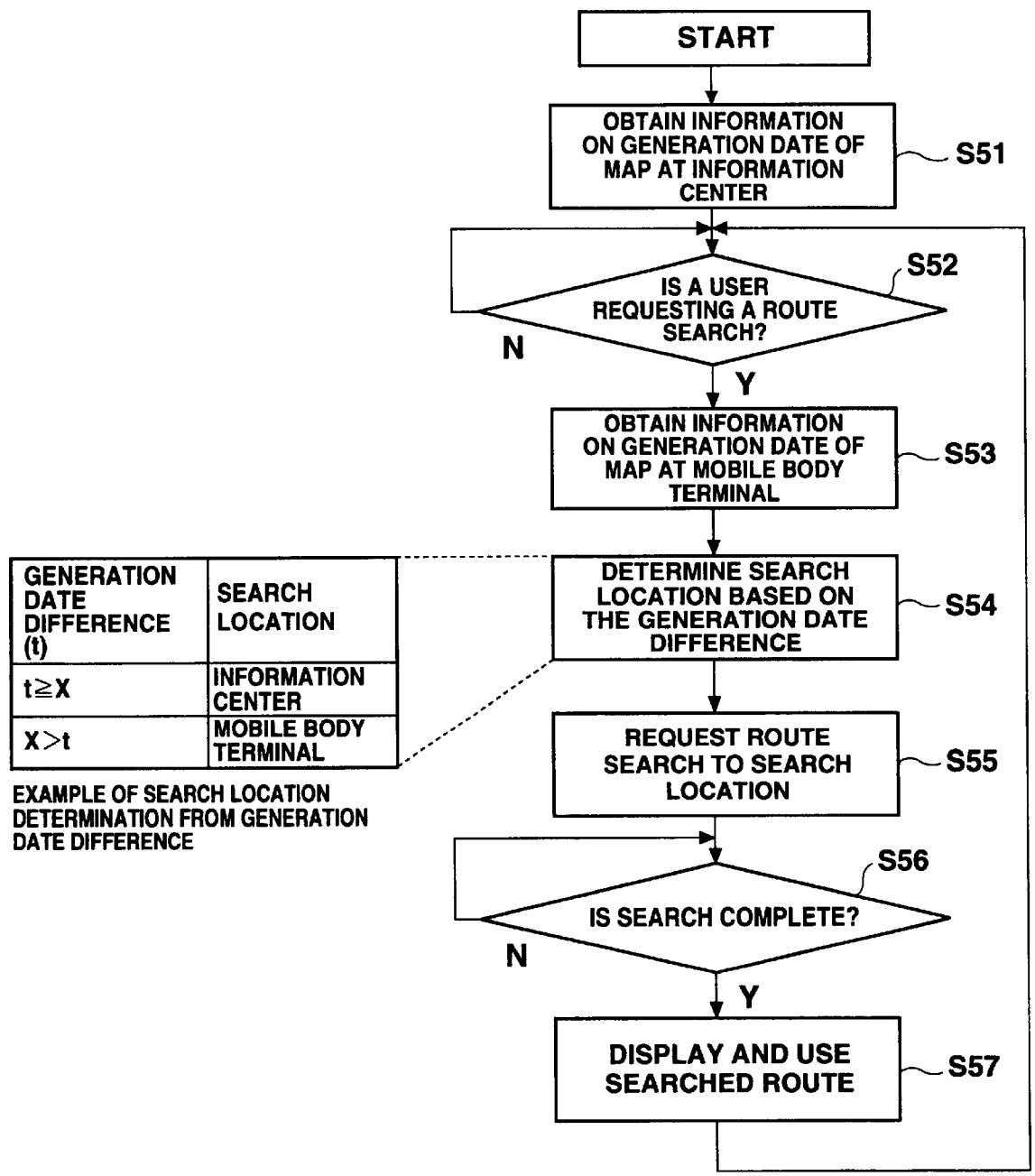
FIG. 6 is a flowchart showing the operation in an example 1-5 of a first embodiment.

FIG. 6 is a flowchart showing an operation of the route search location deciding section 12d in an example 1-5. In this example, the route search location is decided from the date when the map data maintained at the mobile body terminal is generated.

First, information on the date when the map data at the information center is generated is obtained from the information in the information storing section 12c (step S51). The information is periodically obtained and stored in the information storing section 12c upon connecting to the information center 30. It is judged if there is a route search request from a user (step S52), and if there is, the information on the date when the map data at the mobile body terminal is generated is obtained (step S53).

The search location is decided based on the difference in the map generation dates at the information center 30 and at the mobile body 10 (step S54). For example, if the difference in the generation date, t, is larger than a preset threshold value X, the search is requested to the information center 30, otherwise the search is conducted at the mobile body 10.

Based on the search location decision, a route search is requested either to the information center 30 or to the route searching section 12b of the mobile body 10 (step S55). When the search is completed (step S56), the search result is obtained and displayed on the display 16, and guide using the obtained result is executed (step S57).

In this manner, by deciding the route search location from the generation date of the map data maintained at the mobile body terminal, the time and cost for the wireless communication can be reduced while the route is searched using the most recent road data.

Example 1-6

Figure 7:
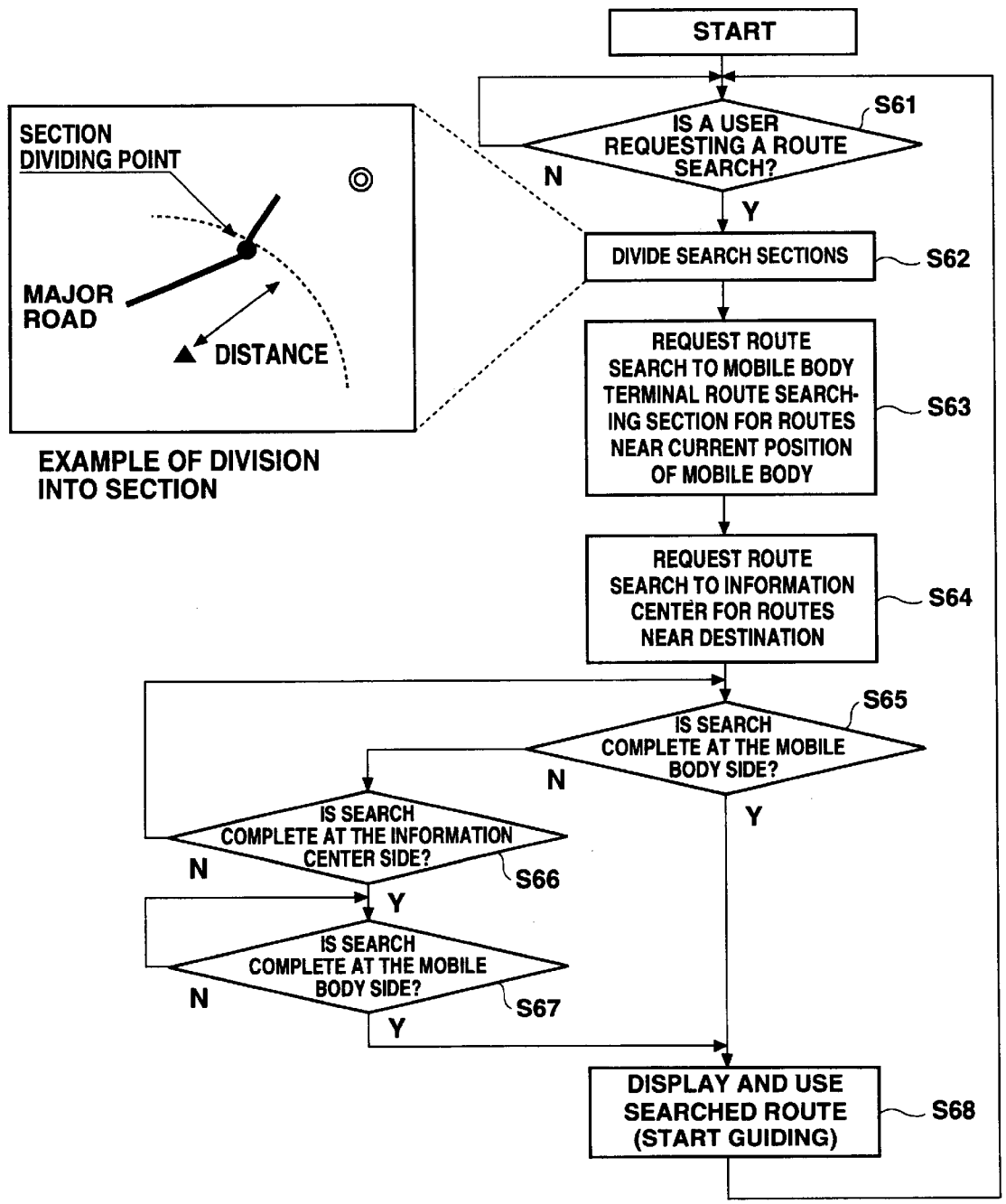
FIG. 7 is a flowchart showing the operation in an example 1-6 of a first embodiment.

FIG. 7 is a flowchart showing an operation of the route search location deciding section 12d in an example 1-6. In this example, the route is divided into sections, and the route is searched at the mobile body terminal for the section near the current position of the mobile body and at the information center for the section far from the current position.

First, it is judged whether a route search is requested by a user (step S61). If there is such a request, the route is divided into sections (step S62). This division of the route into sections is based on the distance from the current position. For example, route in a region where the distance from the current position is less than X km is searched at the mobile body and route search for other regions with a larger distance is requested to the information center. This configuration is based on the concept that it is likely that the search result for a region near the current position needs to be obtained quickly and that the near future information, such as congestion information, is usually correct even from the search result at the mobile body.

Then, route search on the section near the current position of the mobile body is requested from the route searching section 12b (step S63), and the route search for the section near the destination is requested from the information center 30 (step S64).

Then, it is judged whether the route search at both sides are completed (steps S65~S67), and if they are completed, the search result is obtained and displayed on the display 16, and guidance using the obtained result is executed (step S68).

In this manner, by dividing the route into sections and searching routes at the mobile body terminal for sections near the current position of the mobile body and at the information center for sections far from the current position, the route search response time around the mobile body can be shortened and the time from the input of the route search request by the user till the start of the route guidance can be shortened.

It is also preferable to partially divide the route such as to conduct the search at the mobile body only for the main roads such as highways and first class national roads and to request the search from the information center for other sections.

Example 1-7

Figure 8:
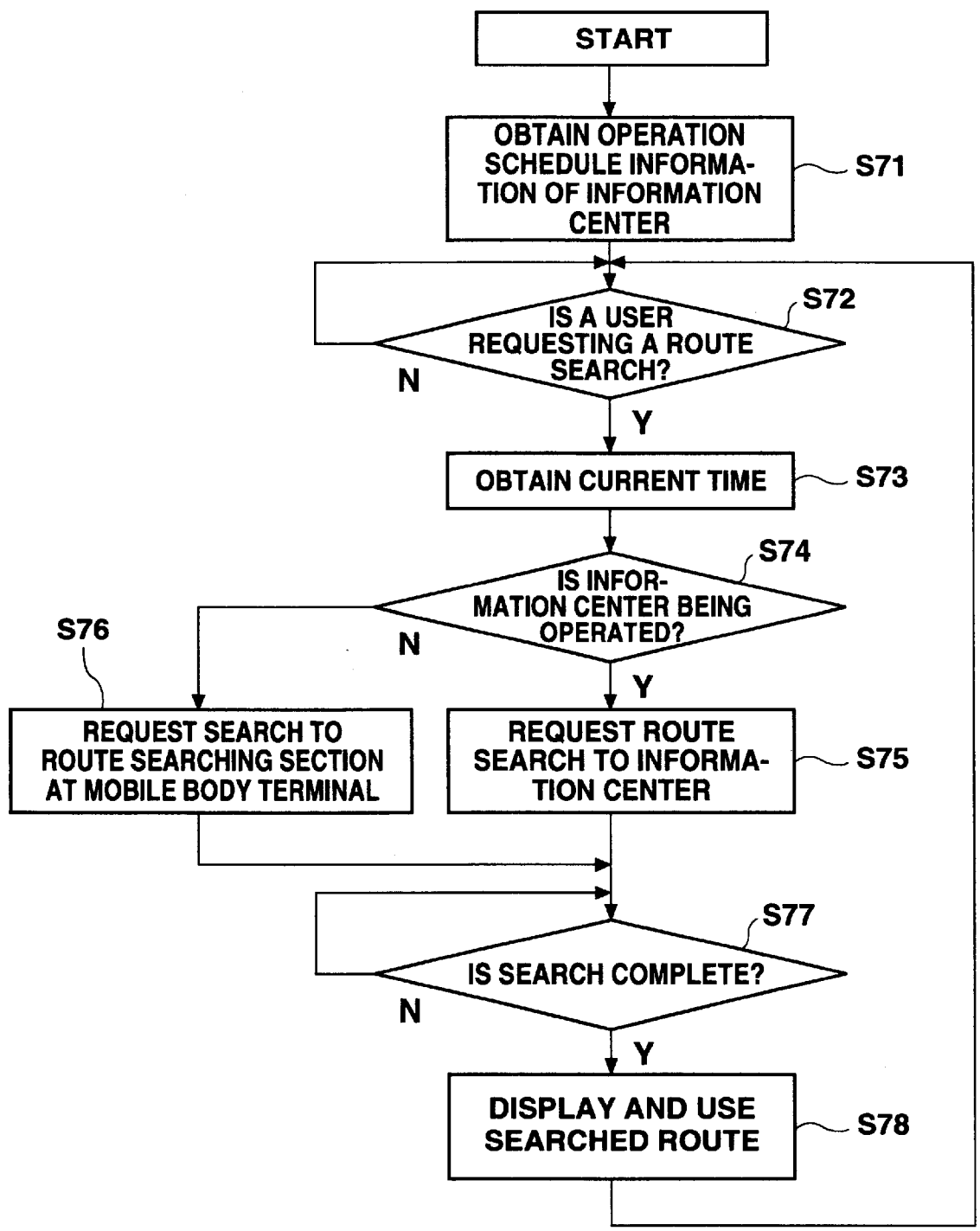
FIG. 8 is a flowchart showing the operation in an example 1-7 of a first embodiment.

FIG. 8 is a flowchart showing an operation of the route search location deciding section 12d in an example 1-7. In this example, the route search location is decided using the operation schedule information of the information center.

First, the information center operation schedule information is obtained from the information in the information storing section 12c (step S71). The information is periodically obtained and stored in the information storing section 12c upon connecting to the information center 30. It is preferable to apply this example to cases where the user is requesting a search from the information center 30 or where it is decided that search is to be requested from the information center 30 due to other conditions.

It is judged whether a route search is requested by a user (step S72). When there is such a request, the current time is obtained (step S73). The current time is obtained using a clock within its own system.

It is then judged whether or not the information center is being operated (step S74). When the information center is being operated, a search is requested from the information center 30 (step S75), otherwise the search is requested from the route searching section 12b of the mobile body (step S76).

When the search is completed (step S77), the search result is obtained and displayed on the display 16, and guidance using the obtained result is executed (step S78).

In this manner, by using the operation schedule information for the information center 30 to decide the route search location, an ineffective route search request issued to the information center when the route searching service by the information center 30 is stopped can be avoided, and thus, the route search response time can be shortened and the time and cost for communication can be reduced.

In this example, a case is presumed where the information center 30 is stopped due to maintenance or the like, but it is also preferable to conduct the search at the mobile body 10 in time periods when the information center is known to be congested or in cases where there is difficulty in the communication line.

Example 1-8

Figure 9:
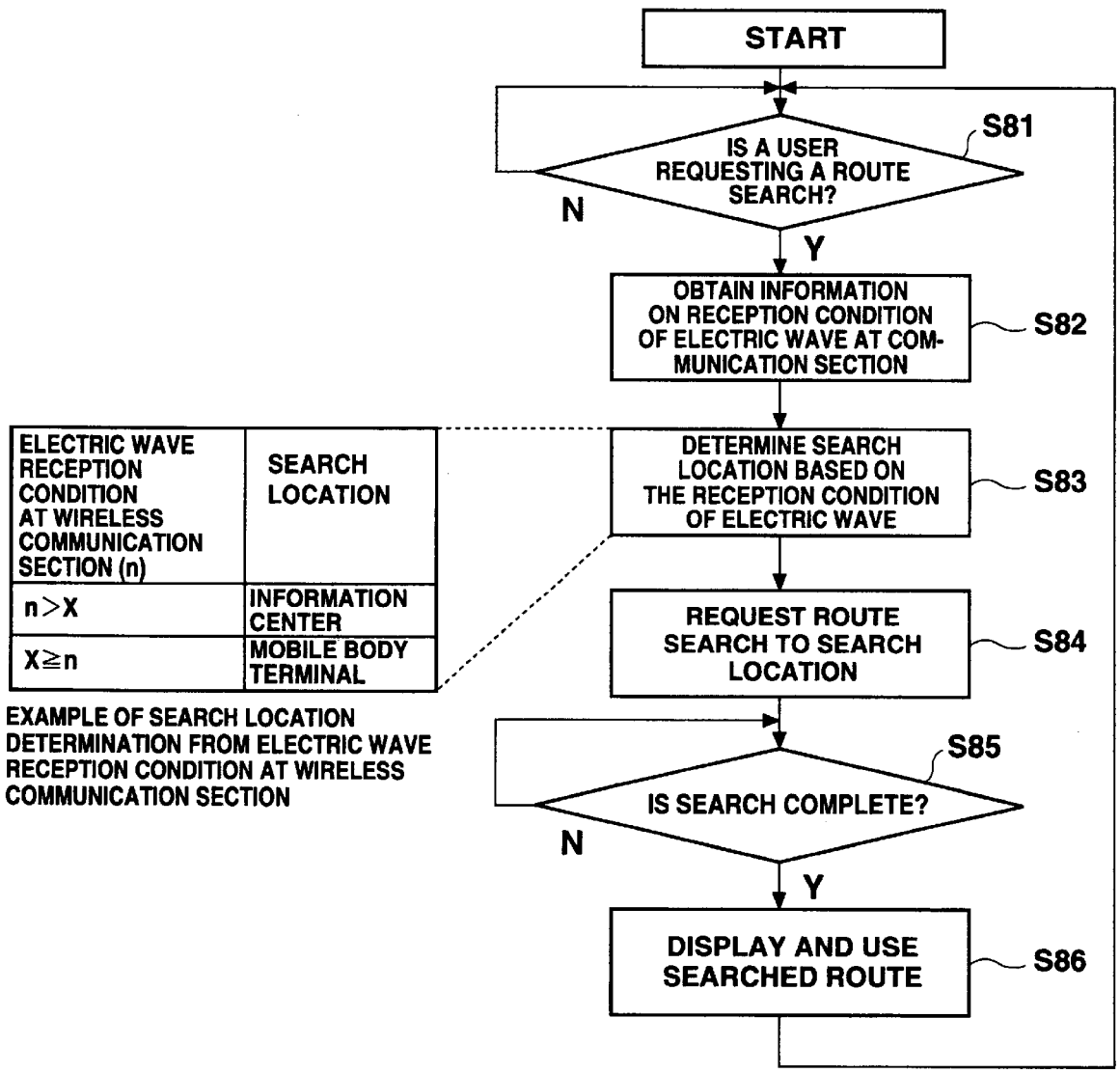
FIG. 9 is a flowchart showing the operation in an example 1-8 of a first embodiment.

FIG. 9 is a flowchart showing an operation of the route search location deciding section 12d in an example 1-8. In this example, the route searching location is decided from the receiving condition of the electric wave at the wireless communication section 24.

It is judged whether a route search is requested by a user (step S81). When there is such a request, the receiving condition information for the electric wave at the wireless communication section 24 is obtained (step S82). The receiving condition of the electric wave is periodically written to the information storing section 12c by the wireless communication section 24.

Based on the receiving condition, the search location is decided (step S83). In this example, the receiving condition is represented by a number n, and when the number n is larger than a predetermined threshold value X, it is judged that the communication can be performed well and the search location is set at the information center, otherwise the mobile body is set as the search location.

When the search is completed (step S85), the search result is obtained and displayed on the display 16, and guidance using the obtained result is executed (step S86).

In this manner, by deciding the route search location from the receiving condition of the electric wave at the wireless communication section, issuing of an ineffective route search request to the information center 30 can be avoided and the route search response time can be shortened.

It is preferable to apply this example to cases where it is already decided that the search is to be conducted at the information center 30.

Example 1-9

Figure 10:
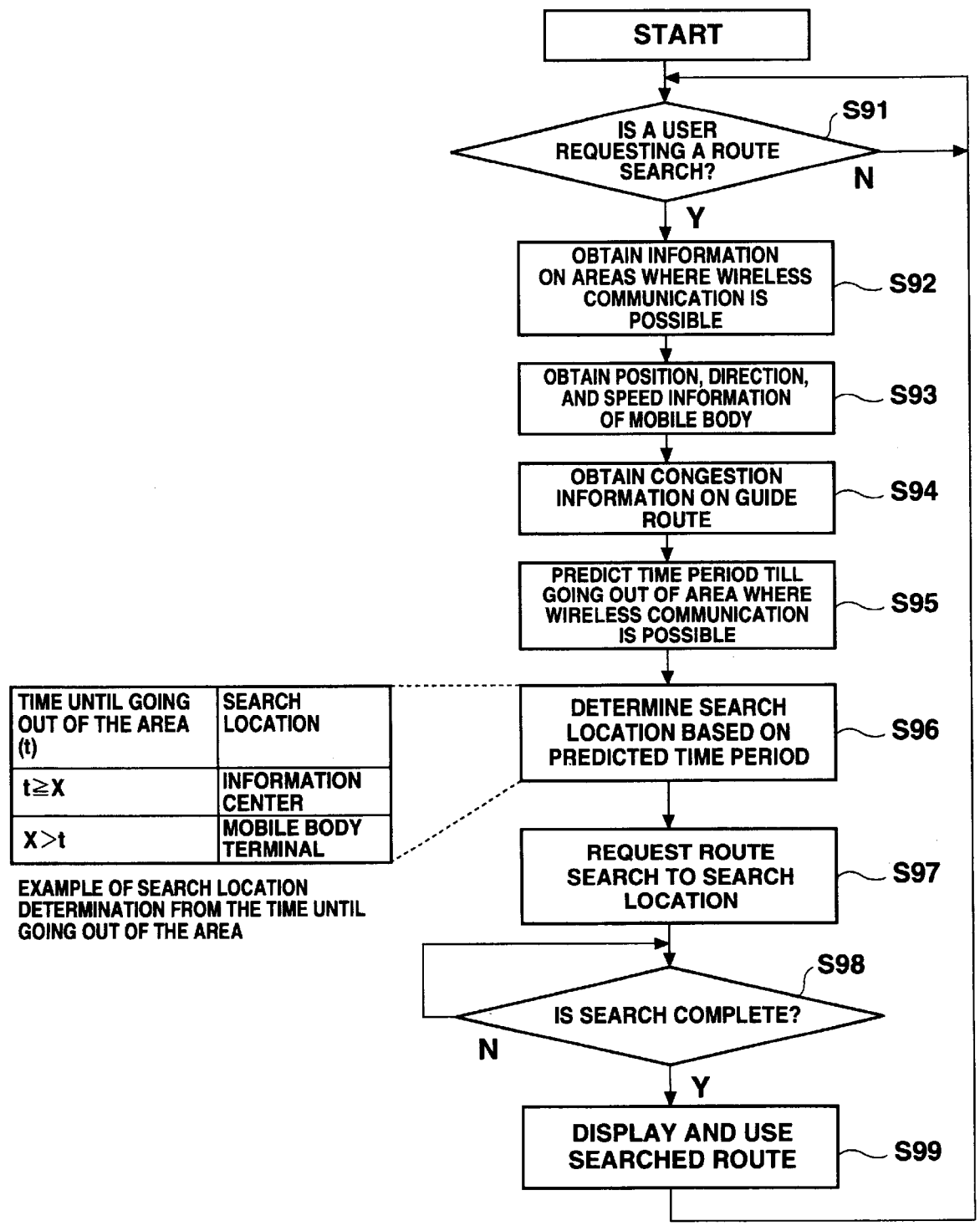
FIG. 10 is a flowchart showing the operation in an example 1-9 of a first embodiment.

FIG. 10 is a flowchart showing an operation of the route search location deciding section 12d in an example 1-9. In this example, a future time period in which communication is possible is predicted from information on areas where wireless communication is possible, the position, orientation, and speed of the mobile body, and congestion information (such as link travel time) of the guide route. The route search location is then decided from the predicted time period.

First, it is judged whether a route search is requested by a user (step S91). When there is such a request, the information on areas where wireless communication is possible is obtained from the information storing section 12c (step S92). It is preferable to write, in the information storing section 12c, the information on areas where wireless communication is possible which is supplied from the information center 30.

Then, the position, direction, and the speed information of the mobile body is obtained from the information storing section 12c (step S93), and the congestion information on the guide route is obtained (step S94). The congestion information is also constantly obtained from the information center 30 and stored in the information storing section 12c. Then, from these items of information, the time until the mobile body moves out of the area where wireless communication is possible is predicted (step S95).

The search location is then decided based on the predicted time period (step S96). For example, if the predicted time t is larger than a predetermined threshold value X corresponding to the time necessary until obtaining the search result, the search location is set at the information center 30, otherwise the search location is set at the mobile body 10.

Then, search is requested from the decided search location (step S97). When the search is completed (step S98), the search result is obtained and displayed on the display 16, and guidance using the obtained result is executed (step S99).

In this manner, by predicting the future time period in which communication is possible, from the information on the areas where wireless communication is possible, the position, orientation, and speed of the mobile body, and the congestion information (such as the link travel time) on the guide route, and deciding the search location from the predicted time period, ineffective route search request to the information center can be avoided and the route search response time can be shortened.

It is preferable to apply this example to cases where it is already determined that the search is to be conducted at the information center 30.

Example 1-10

Figure 11:
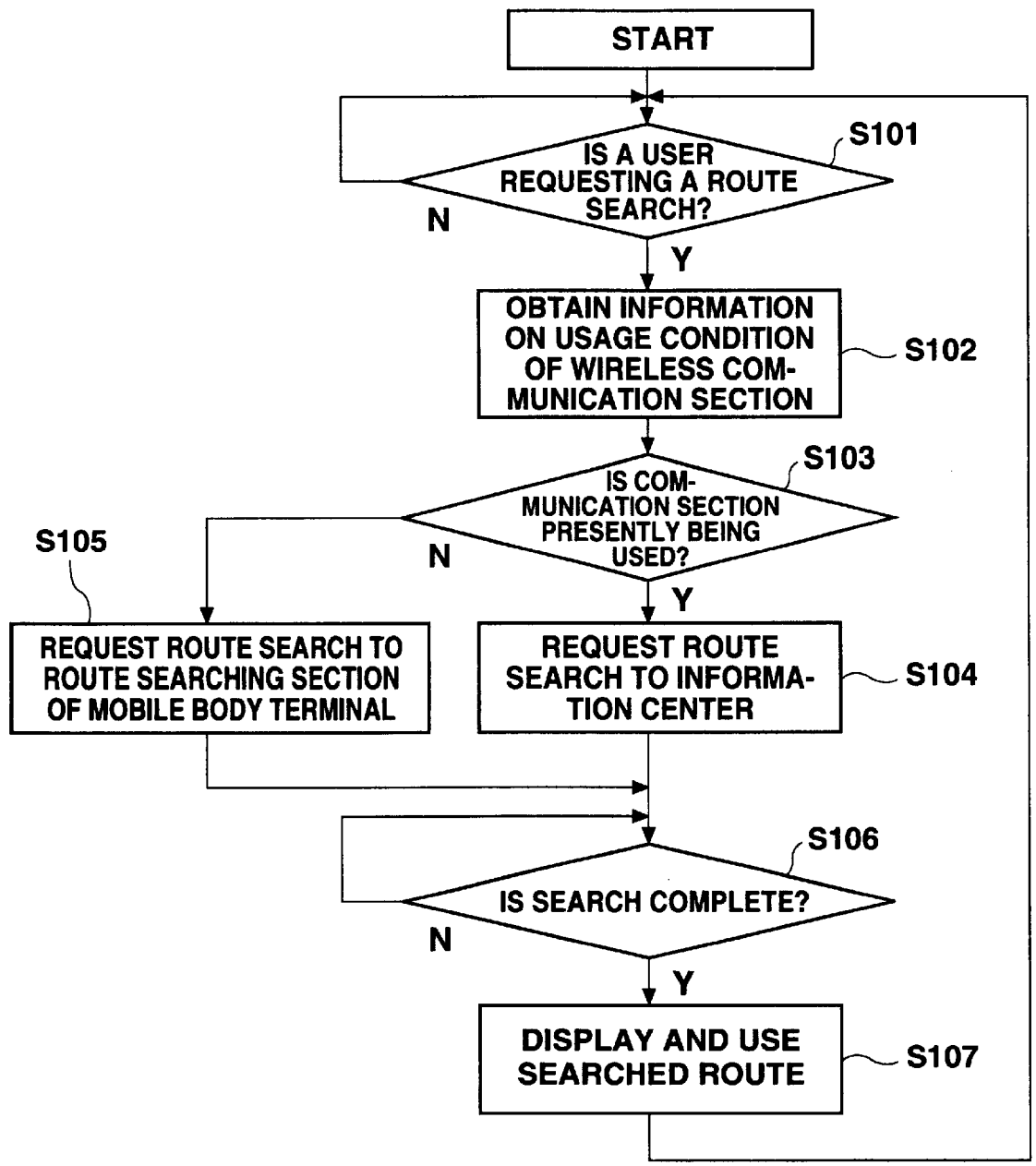
FIG. 11 is a flowchart showing the operation in an example 1-10 of a first embodiment.

FIG. 11 is a flowchart showing an operation of the route search location deciding section 12d in an example 1-10. In this example, the usage condition (transmission and reception) of the wireless communication section is used to decide or to change the route search location.

First, it is judged whether route search is requested by a user (step S101). When there is such a request, usage condition information of the wireless communication section is obtained from the information storing section 12c (step S102). The information is written to the information storing section 12c by the wireless communication section 24.

Then, it is judged whether or not the wireless communication section 24 is in use based on the obtained information (step S103). For example, there can be cases where the wireless communication section 24 is in use for transmission or reception of mail or for voice conversation.

If it is judged that the wireless communication section 24 is in use as a result of this judgement, search is requested from the information center 30 (step S104), otherwise the search is requested from the route searching section 12b of the mobile body 10 (step S105).

When the search is completed (step S106), the search result is obtained and displayed on the display 16, and guidance using the obtained result is executed (step S107).

In this manner, by using the usage condition (transmission and reception) of the wireless communication section 24 to decide or change the route search location, it is possible to avoid elongating the route search response time even when the data communication using the wireless communication is interrupted.

It is preferable to apply this example to cases where it is already determined to conduct the search at the information center 30.

Example 1-11

Figure 12:
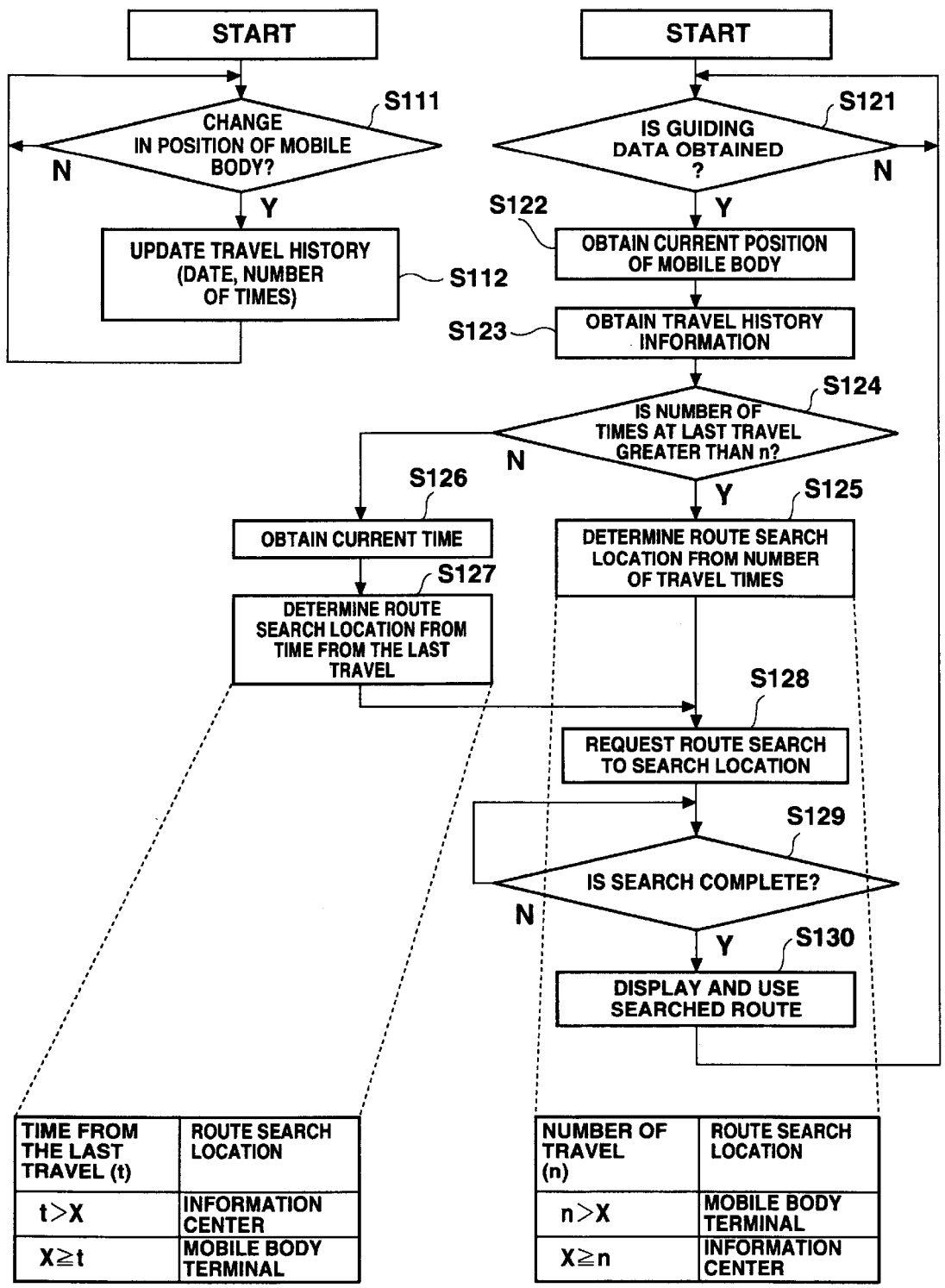
FIG. 12 is a flowchart showing the operation in an example 1-11 of a first embodiment.

FIG. 12 is a flowchart showing an operation of the route search location deciding section 12d in an example 1-10. In this example, whether or not the use is knowledgeable about the road is predicted from the position of the mobile body, past movement history (such as the number of times traveled on the road section or point within the guide route, or the time elapsed from the last time when the user moved), and the route search section, in order to decide the route search location.

First, in this example, when there is a positional change (travel by a vehicle) of the mobile body (step S111), passage history is updated (step S112) which holds the history of where and how many times the mobile body traveled. The passage history is stored in the information storing section 12c.

It is judged whether guiding data for route guidance (such as, for example, data on destination or intermediate points) is obtained (step S121). If the guiding data is obtained, the current position information of the mobile body is first obtained (step S122), and the passage history information is again obtained (step S123).

It is then judged if the number of times traveled, n, for the mobile body from the current position to the destination in the past is larger than a predetermined threshold value X (step S124). If this is the case, it is determined that the user has traveled this route for a number of times, and that the user is satisfied with the route setting by the mobile body, and thus, the search location is set at the mobile body (step S125). If, on the other hand, it is judged that the number of times traveled is less than the predetermined number of times, the current time is obtained (step S126), the time from the most recent travel is calculated, and the search location is decided based on the time period (step S127). If the time period exceeds a predetermined value, the search location is set at the information center 30, otherwise the search location is set at the mobile body 10.

When the search location is decided, a search is requested from the decided search location (step S128). When the search is completed (step S129), the search result is obtained and displayed on the display 16, and guidance using the obtained result is executed (step S130).

In this manner, by predicting whether or not the user has knowledge of the road from the position of the mobile body, the past movement history (such as the number of times traveled on the road section or point within the guide route, or the time from the most recent travel), and route search section, to decide the route search location, the time and cost for communication can be reduced.

Example 1-12

Figure 13:
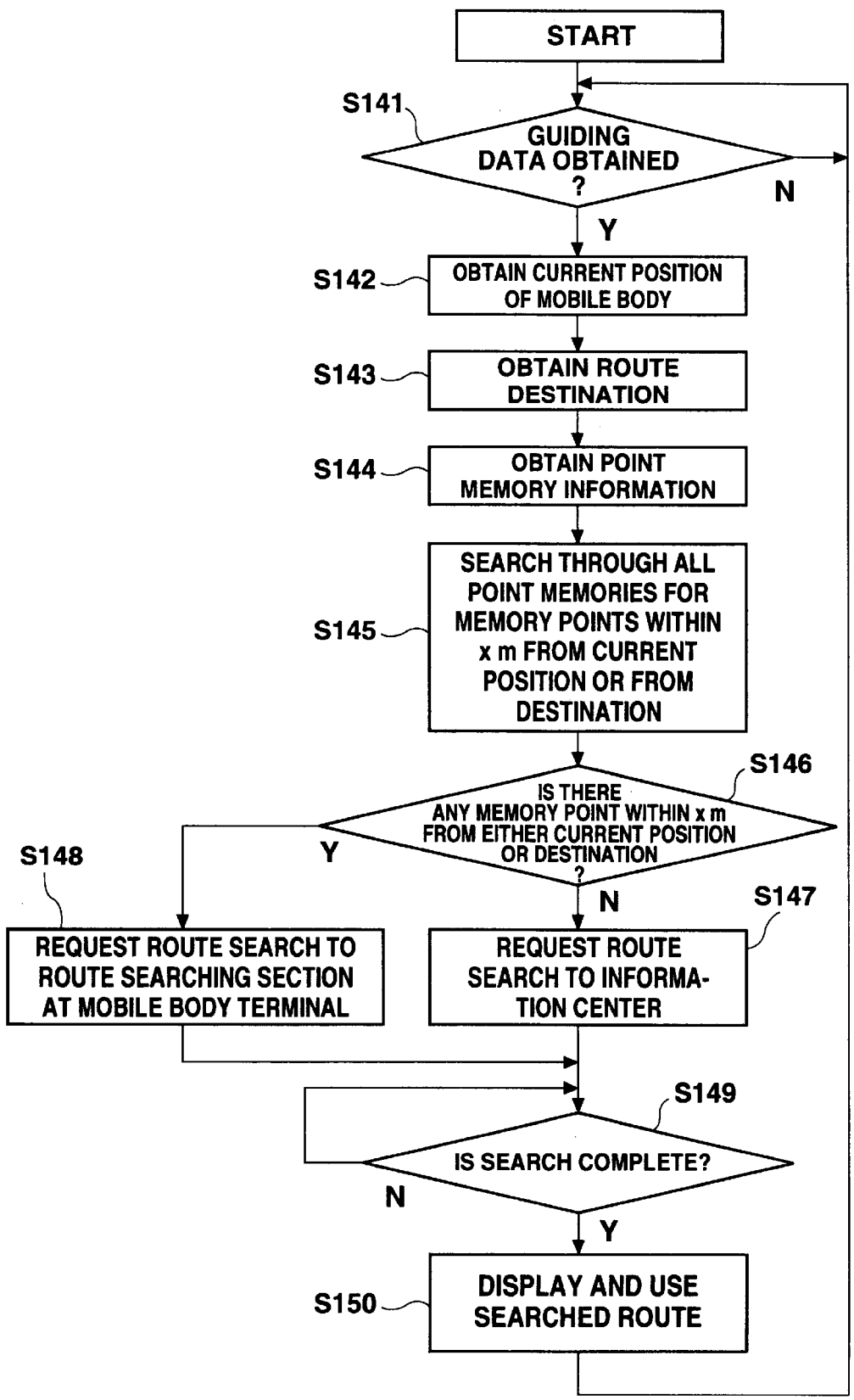
FIG. 13 is a flowchart showing the operation in an example 1-12 of a first embodiment.

FIG. 13 is a flowchart showing an operation of the route search location deciding section 12d in an example 1-12. In this example, whether or not the user has knowledge of the road is predicted from the position of the mobile body, point memory information (such as home for the user) designated by the user, and the route search section, in order to decide the route search location.

It is judged whether guiding data (such as, for example, data on destination and intermediate points) is obtained for route guidance (step S141). When guiding data is obtained, the current position information of the mobile body is first obtained (step S142), and the information on the destination is obtained (step S143).

Point memory information is then obtained (step S144). The point memory is provided at the navigation device for inputting the destination with one touch, and a plurality of point data can be stored in the point memory. For example, points that are frequently designated as a destination such as home, a friend's house, or workplace can be stored in the point memory.

For all the points stored in the point memory, it is judged whether the current position or the destination is within a radius of x m (step S145). This is because the user usually knows the area around points stored in the point memory.

If neither the current position nor the destination is within a radius of x m from any of the points stored in the point memory, a search is requested from the information center (step S147), otherwise the search is requested from the route searching section 12b of the mobile body (step S148). When the search is completed (step S149), the search result is obtained and displayed on the display 16, and guidance using the obtained result is executed (step S150).

In this manner, by predicting whether or not the user has knowledge of the road from the position of the mobile body, the point memory information set by the user (such as home), and route search section, to decide the route search location, the time and cost for communication can be reduced.

Example 1-13

Figure 14:
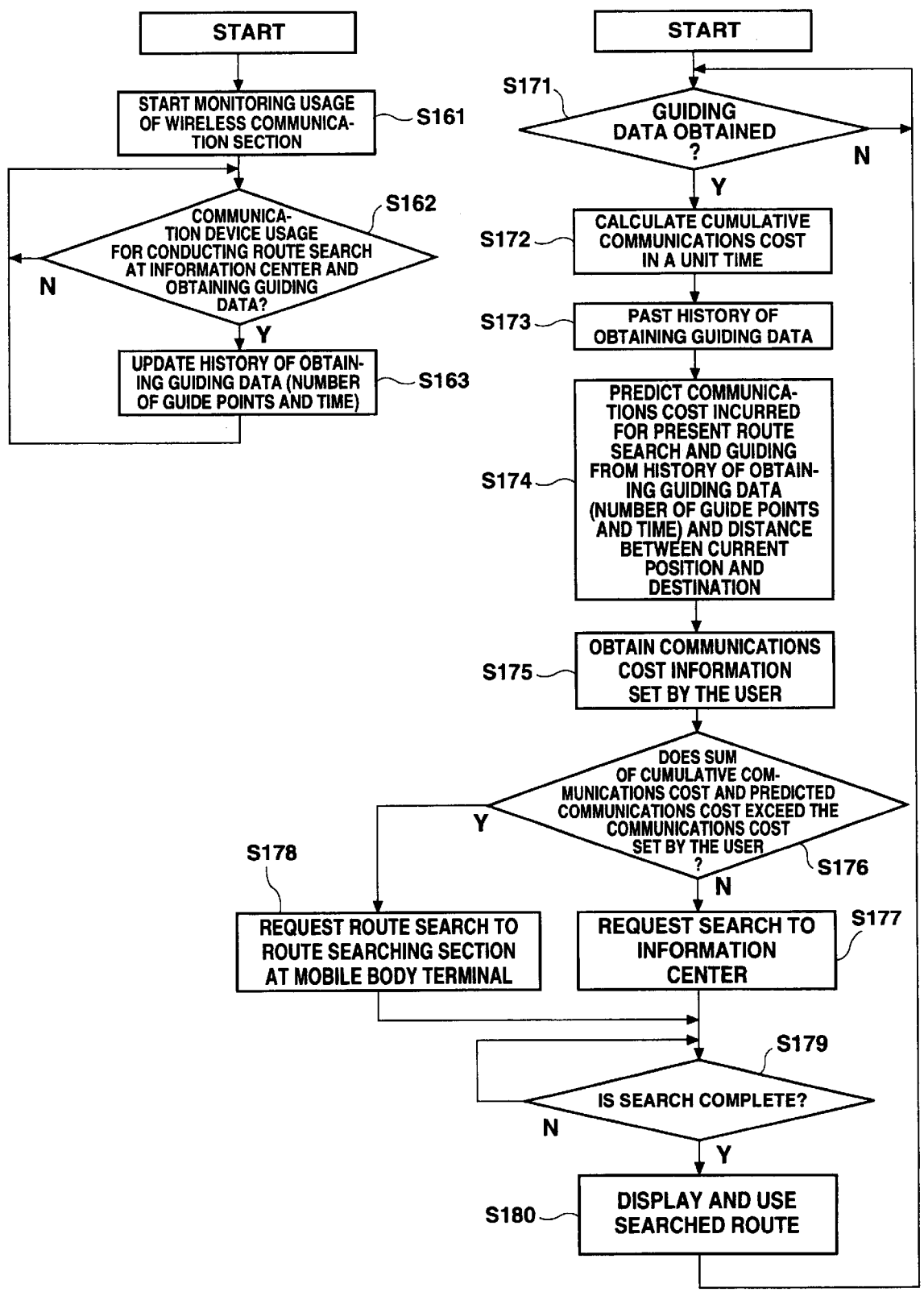
FIG. 14 is a flowchart showing the operation in an example 1-13 of a first embodiment.

FIG. 14 is a flowchart showing an operation of the route location deciding section 12d in an example 1-13. In this example, the communications cost set by the user, communications cost spent in a unit time, map data maintained at the mobile body terminal, and communications cost due to route search request to the information center (including the communications cost for providing the route guiding data) are predicted to calculate the predicted communications cost in a unit time for conducting a route search at the information center. From the predicted communications cost, the route search location is decided.

First, in this example, the usage of the wireless communication section 24 is constantly monitored (step S161). It is then judged whether there is a communication for searching a route at the information center and for obtaining guiding data (step S162). When there is a usage, guiding data is obtained and the history for destination and time are updated (step S163). In this manner, a history of information center usage till the present time is recorded in the information storing section 12c.

It is judged whether guiding data (such as, for example, data on destination or on the intermediate points) for route guidance is obtained (step S171). When guiding data is obtained, the current position information of the mobile body is first obtained, and cumulative communications cost for a predetermined unit of time (for example, one month) is calculated (step S172). It is also possible to calculate the communications cost using a management program for managing the communications cost.

Then, the past guiding data is obtained (step S173), and the communications cost for route search and guide is predicted from the history of the guiding data (number of guiding points, time, or the like) and the distance between the current position and destination (step S174). The communications cost set by the user is also obtained (step S175). This information is preset by a user as a cost per month and stored in the information storing section 12c.

It is then judged whether the value calculated from adding the predicted cost to the cumulative communications cost exceeds the cost set by the user (step S176). If this is not the case, then a search is requested to the information center 30

(step S177), otherwise the search is requested to the route search section 12*b* of the mobile body 10 (step S178). When the search is completed (step S179), the search result is obtained and displayed on the display 16, and guidance using the obtained result is executed (step S180).

In this manner, by predicting communications cost set by the user, communications cost spent in a unit time, map data at the mobile body terminal, and communications cost for the route search request at the information center (including the communications cost for providing the route guiding data), to calculate predicted communications cost in a unit time for conducting a route search at the information center, and by deciding the route search location from the predicted communications cost, the communications cost within the unit time can be limited to less than the value set by a user.

It is preferable to combine the above examples to suit the needs of each user. Moreover, it is also preferable to decide the route search location by a user input or setting. In this manner, the guiding routes and communications time and cost can be adjusted to suit the user's preferences.

Second Embodiment

In a second embodiment of the present invention, route data obtained from the information center 30 is used for a map matching process at the current position calculating section 12*a*.

In map matching, the current position is compensated to a position on a road by overlapping the history of current positions obtained at the current position detecting section 20 and the road data from the map data storing section 14.

Figure 15:
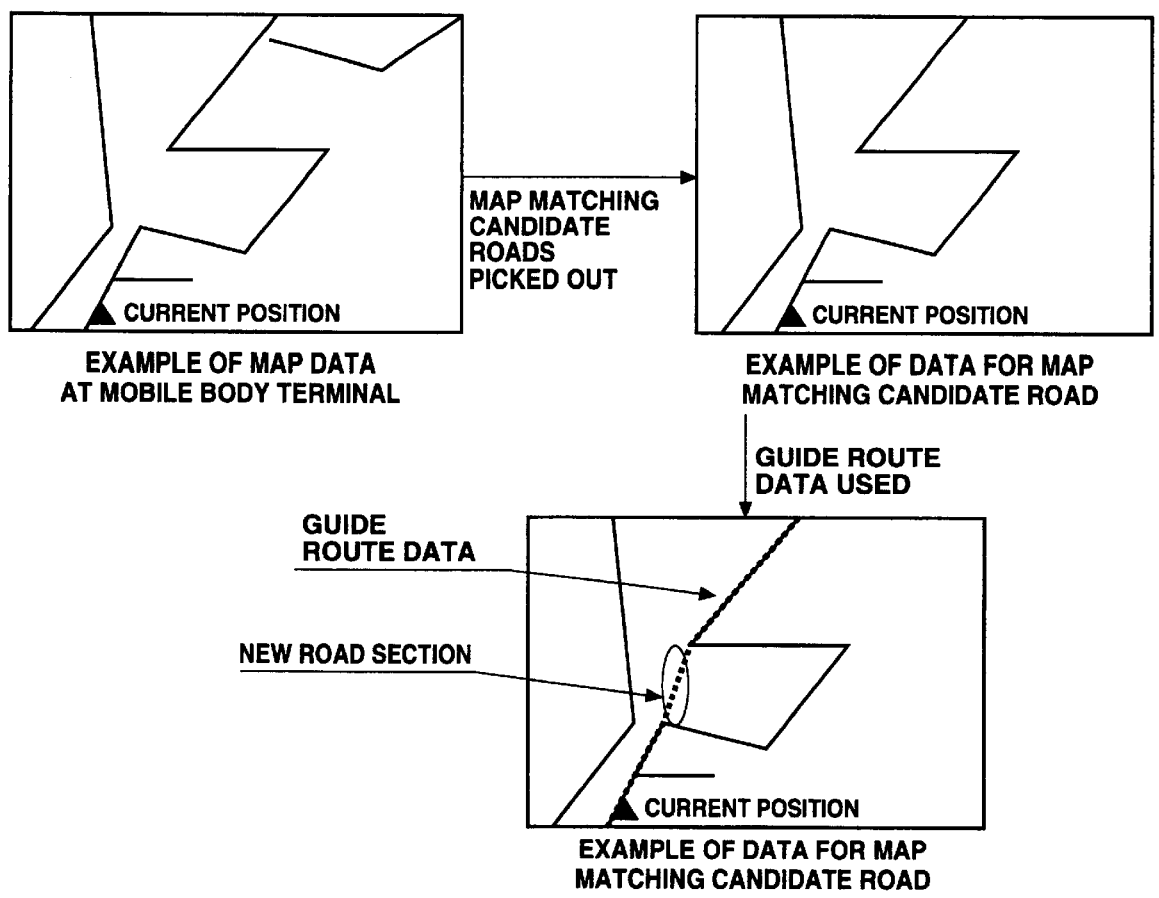
FIG. 15 is a diagram for explaining map matching process in a second embodiment.

In the embodiment, as shown in FIG. 15, guide route data is added to the road data to be used in the map matching process. A figure at the top left of FIG. 15 shows an example of map data at the mobile body. When map matching is executed, the road candidates are picked up as objects for map matching based on the current position as shown at the top right of the FIG. 15. As shown in the bottom right of FIG. 15, the guide route data is overlapped on the map matching candidate road.

In this example, there are sections that overlap and sections that do not. It is therefore probable that a road exists which does not exist in the map data on the mobile body. As the mobile body travels along the guide route and proceeds into the portion where there is no road data, map matching cannot be executed well at the current position calculating section 12*a*. In the present embodiment, by adding the guide route data as a map matching candidate, such a problem can be solved.

The process for the embodiment will now be described in detail.

Example 2-1

Figure 16:
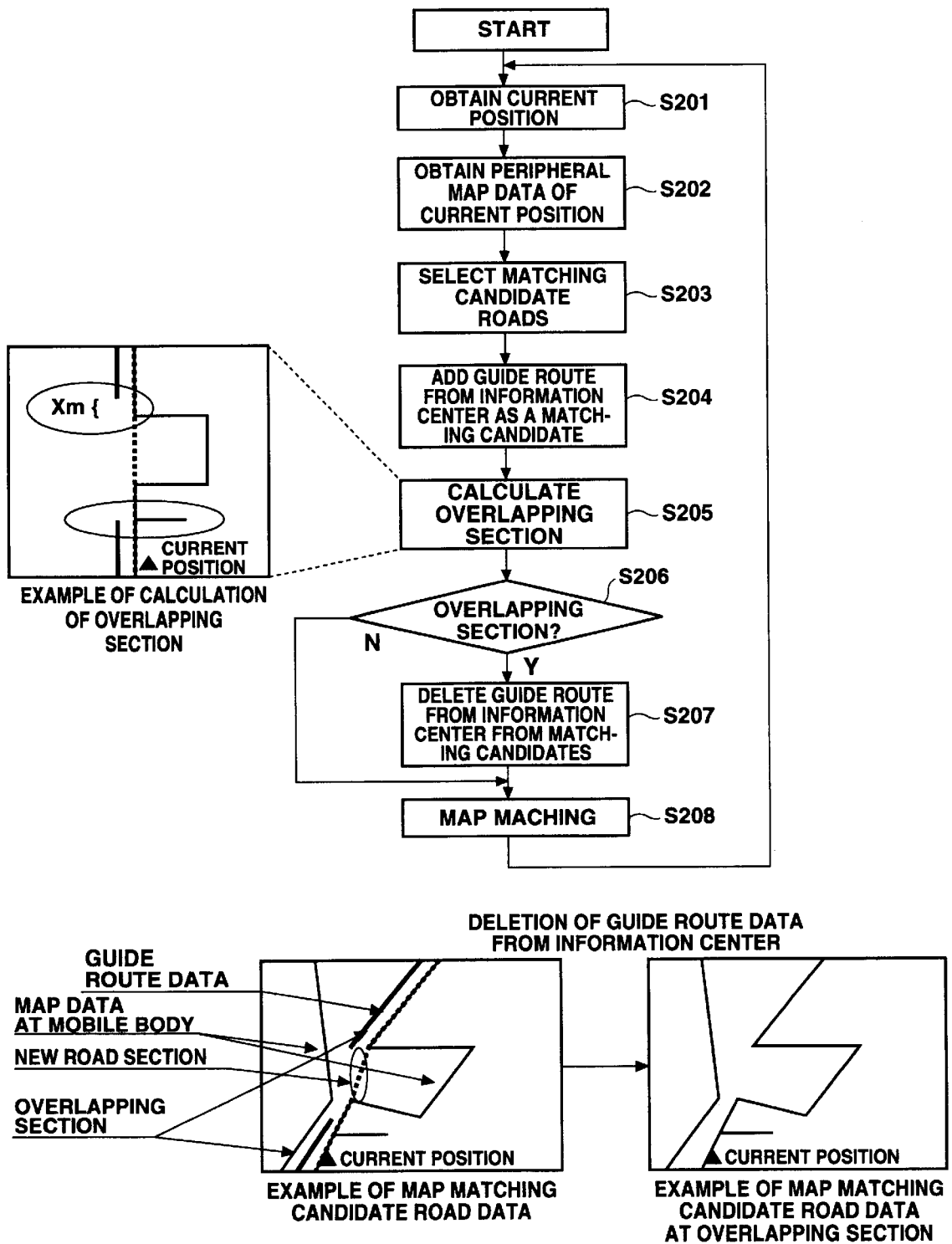
FIG. 16 is a flowchart showing the operation in an example 2-1 of a second embodiment.

FIG. 16 is a flowchart showing an operation of the current position calculating section 12*a* in an example 2-1. In this example, the guide route data obtained from the information center is added to the matching candidate road data selected from the map data maintained at the mobile body terminal and the map matching is executed.

First, the current position is obtained from the current position detecting section 20 (step S201). Map data for the region around the current position is obtained from the map data storing section 14 (step S202). Map matching candidate roads are selected from the obtained map data (step S203). The guide route from the information center is then added as a map matching candidate (step S204).

Then, an overlapping section is determined (step S205). That is, most of the sections in the map data at the mobile body should be correct, and thus, should overlap the route data from the information center.

It is judged whether the current position is within the overlapping section (step S206). If the current position is within the overlapping section, the guide route from the information center is deleted from the map matching candidates (step S207), and then the map matching is executed.

In this manner, map matching can be executed for the road portion which does not exist in the map data in the mobile body using the guide route data, and thus, more suitable map matching process can be executed. In other words, even when the mobile body proceeds into a guide route that is not present in the map data at the mobile body terminal, the current position can still be accurately specified.

Particularly, in the section where the guide route data obtained from the information center and the map data maintained at the mobile body terminal overlap, the map matching can be executed by using only the map data maintained at the mobile body terminal, and thus, the map matching load for the overlapping section can be reduced.

Here, a portion in the overlapping section near the non-overlapping section can be considered as a non-overlapping section, and guide route data is added for these sections, in order to allow for smooth translation between the sections. It is preferable to assign, for example, a portion of X m as a non-overlapping section or to assign the portion closer to the non-overlapping section from the last branch point at the overlapping section on the map.

Example 2-2

Figure 17:
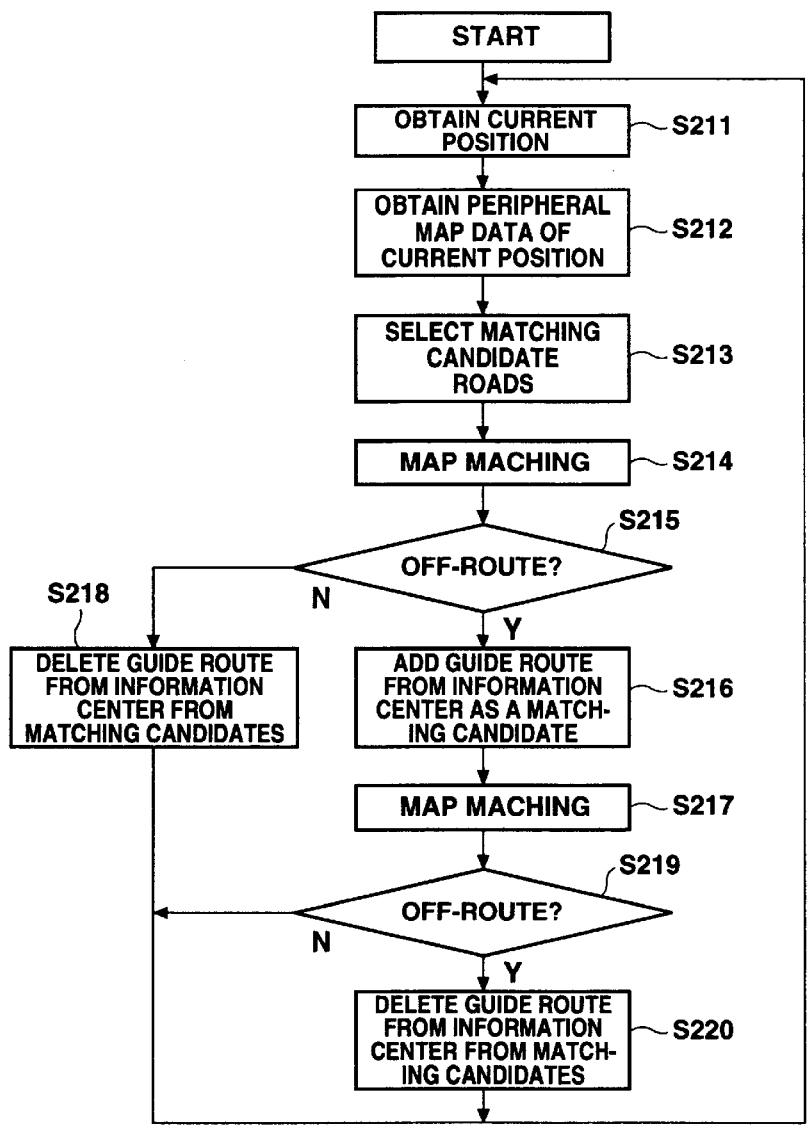
FIG. 17 is a flowchart showing the operation in an example 2-2 of a second embodiment.
Figure 17:
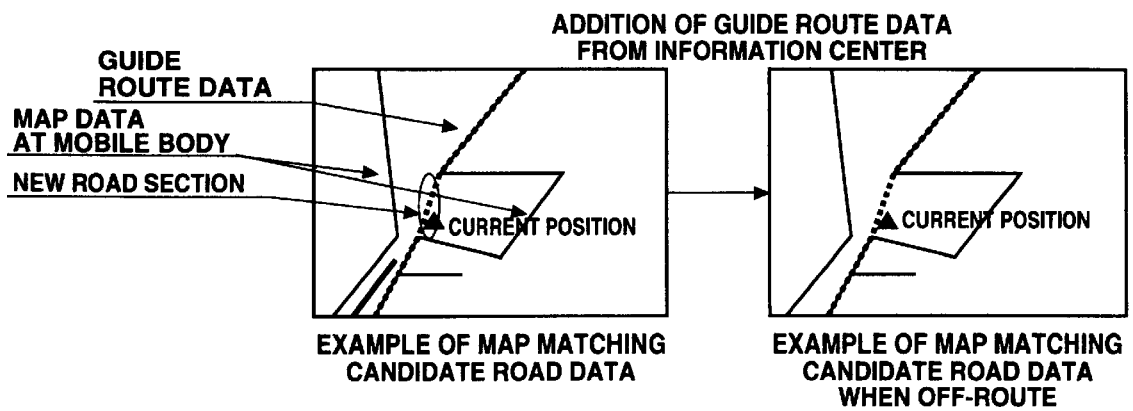

FIG. 17 is a flowchart showing an operation of the current position calculating section 12*a* in an example 2-2. In this example, the map matching is normally executed using map data maintained at the mobile body terminal, except when the current position goes off-route from the road on the map data, in which case, the guide route data obtained from the information center is added as a matching candidate to execute the map matching process.

First, the current position is obtained from the current position detecting section 20 (step S211) and the map data around the current position is obtained from the map data storing section 14 (step S212). Map matching candidate roads are selected from the obtained map data (step S213), and map matching is executed (step S214).

It is then judged, at the map matching, whether the current position is off-route (step S215). If it is, then the guide route from the information center is added as a map matching candidate (step S216), and map matching is executed (step S217). If, on the other hand, the mobile body has not gone off-route, the guide route from the information center is deleted from the map matching candidates (step S218). Moreover, if it is judged that the current position is off-route even at the map matching with the guide route from the information center added in step S217 (step S219), the guide route from the information center is deleted from the map matching candidates (step S220).

In this manner, by executing map matching normally using the map data maintained at the mobile body terminal and by executing map matching with guide route data obtained from the information center added as a map matching candidate only when the current position is off from the roads in the map data, the current position can be accurately specified. The processing load on the CPU due to the map matching process can be reduced by only using the CPU when necessary.

Example 2-3

Figure 18:
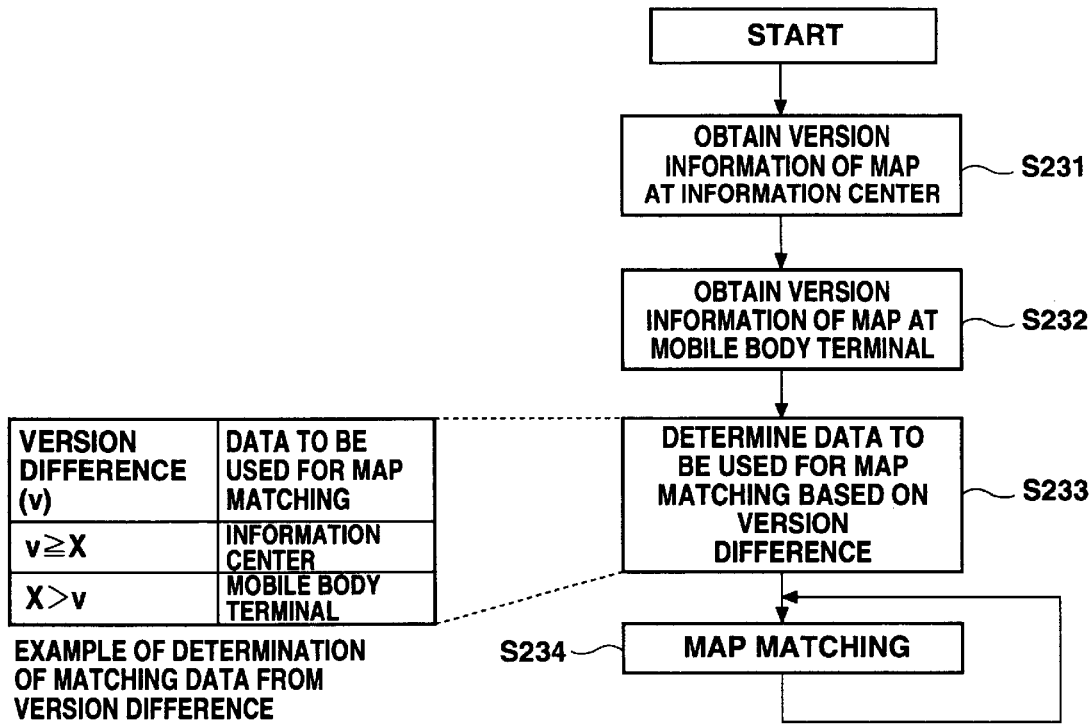
FIG. 18 is a flowchart showing the operation in an example 2-3 of a second embodiment.

FIG. 18 is a flowchart showing an operation of the current position calculating section 12a in an example 2-3. In this example, matching data is determined (guide route data obtained from the information center) from the version of the map data maintained at the mobile body terminal.

First, version information of the map at the information center is obtained from the information storing section 12c (step S231). This information is periodically obtained and stored in the information storing section 12c upon connecting to the information center 30. Then, the version information of the map at the mobile body terminal is obtained (step S232).

It is then judged whether or not to use the guide route from the information center as a map matching candidate based on the version difference between the information center 30 and the mobile body 10 (step S233), and map matching is executed based on the decision (step S234).

In this example, if the version at the information center is a.b.c and the version at the mobile body is d.e.f, a version difference, v, is calculated from an equation $v = m * (a-d) + n * (b-e) + o * (c-f)$. When the version difference v is greater than a preset threshold value X, guide route data from the information center 30 is added as a map matching candidate, otherwise the guide route data is not added. The version data is divided into three portions because the first number is changed for a major modification, second number is changed for a medium modification, and the third number is changed for a minor modification. The numbers m, n, and o are weights that are determined based on the extent of these modifications.

In this manner, by deciding the matching data (guide route data obtained from the information center) from the version of the map data maintained at the mobile body terminal, the processing load of the CPU due to the map matching process can be reduced.

Example 2-4

Figure 19:
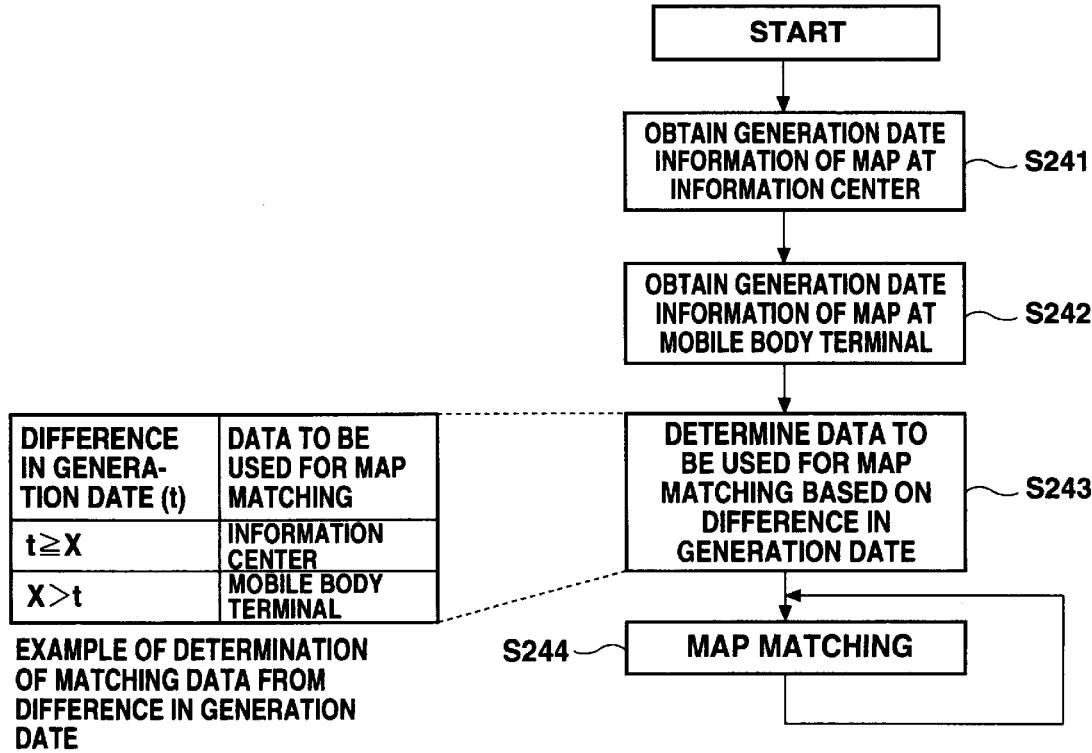
FIG. 19 is a flowchart showing the operation in an example 2-4 of a second embodiment.

FIG. 19 is a flowchart showing an operation of the current position calculating section 12a in an example 2-4. In this example, the matching data (guide route data obtained from the information center) is determined from the generated date for the map data maintained at the mobile body terminal.

First, the date information of the date when the map in the information center is generated is obtained from the information storing section 12c (step S241). This information is periodically obtained and stored in the information storing section 12c upon connecting to the information center 30. Then, information on the date on which the map at the mobile body terminal is generated is obtained (step S242).

It is then judged whether or not to use the guide route from the information center as a map matching candidate based on the difference in date of generation for map data at the information center 30 and at the mobile body 10 (step S243), and the map matching is executed based on the decision (step S244).

In this example, the guide route from the information center 30 is added as a candidate when the difference in the generation date, t, is greater than a preset threshold value X, otherwise, it is not added.

In this manner, by deciding the matching data (guide route data obtained from the information center) from the generation date of the map data maintained at the mobile body terminal, processing load of the CPU due to the map matching process can be reduced.

Example 2-5

Figure 20:
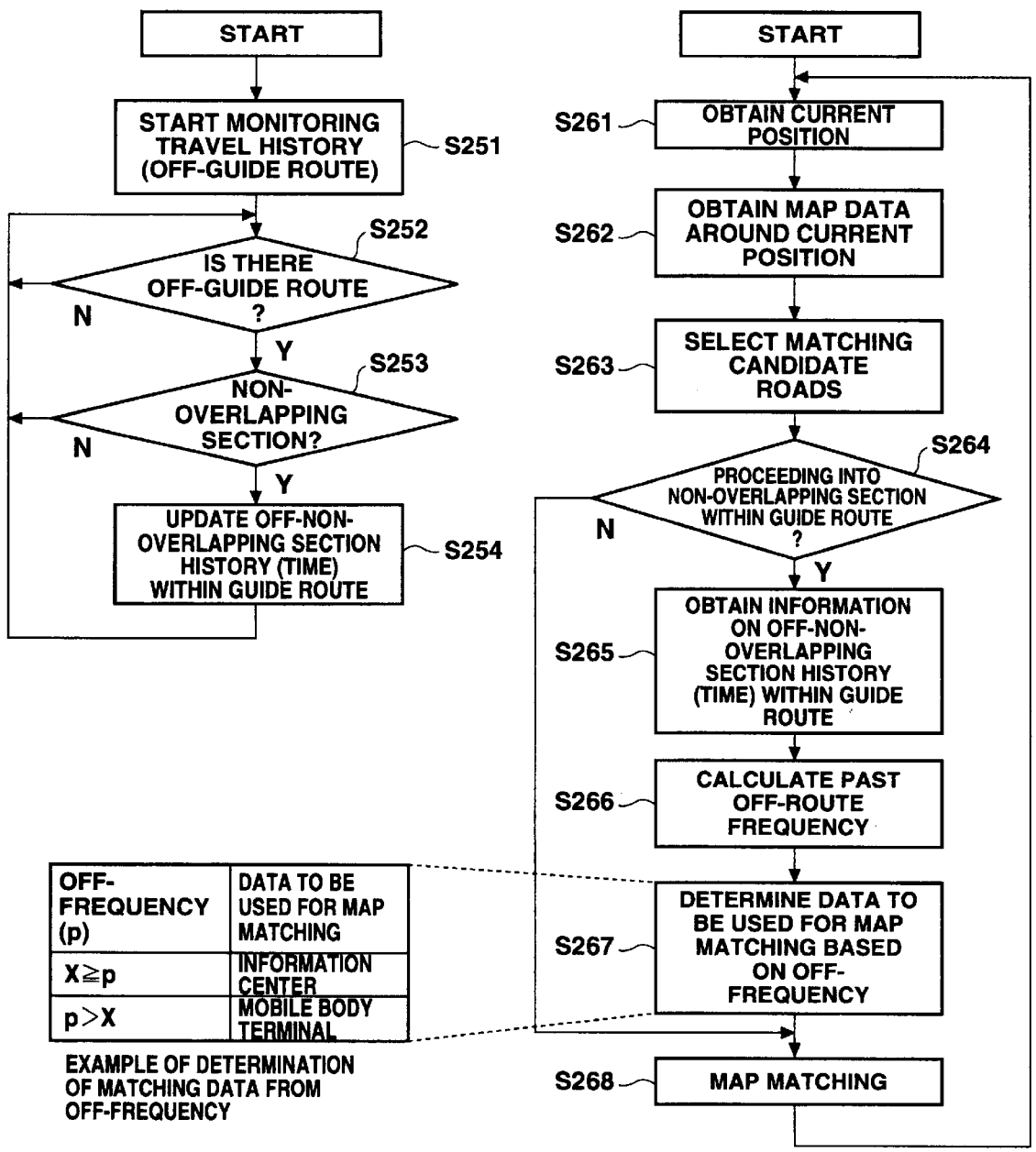
FIG. 20 is a flowchart showing the operation in an example 2-5 of a second embodiment.

FIG. 20 is a flowchart showing an operation of the current position calculating section 12a in an example 2-5. In this example, the matching candidate is switched from the map data maintained at the mobile body terminal to the guide route data obtained from the information center when the mobile body proceeds into a section where the guide route data obtained from the information center and the map data maintained at the mobile body terminal are not overlapping, based on the travel history (frequency of proceeding off the guide route) of the user for such a section when a guide route data is obtained.

First, the mobile body is monitored, while travelling, to determine if the mobile body goes off the guide route (step S251). When the mobile body goes off the guide route (step S252), it is judged whether this is in the non-overlapping section (step S253). In other words, it is judged whether or not the section is where the map data in the mobile body and guide route data do not overlap. If this is the case, off-route history at non-overlapping section is updated (step S254). In this manner, information on whether or not the user tends to follow the guide route in the non-overlapping section can be accumulated.

When the mobile body is travelling, the current position is first obtained from the current position detecting section 20 (step S261) and the map data around the current position is obtained from the map data storing section 14 (step S262). Map matching candidate roads are selected from the obtained map data (step S263).

It is then judged whether the mobile body proceeded into the non-overlapping section within the guide route (step S264). If this is not the case, then map matching is executed by using the matching candidate roads selected at step S263 (step S268). If, on the other hand, the result of the judgement is "yes", then the history information of past off-routes in the non-overlapping section within the guide route is obtained (step S265). From this information, the frequency of the user going off the guide route in the past at the non-overlapping section is calculated (step S266). Based on the off frequency, it is judged that there is no need to add the guide route as a candidate when the off frequency is high, and the guide route is not added. When the off frequency is low, on the other hand, the guide route is added as a candidate.

After determining whether or not to use the guide route data for map matching, the map matching is executed using such data (step S268).

In this manner, by using the user's travel history (frequency of going off the guide route) on the guide route data obtained from the information center for the section of the guide route data where it does not overlap the map data maintained at the mobile body terminal, and deciding whether to switch the matching candidate from the map data to the guide route data when the mobile body proceeds into a section where the guide route data and the map data do not overlap, the current position can be accurately specified even when the mobile body proceeds onto a guide route which does not exist in the map data at the mobile body terminal.

Example 2-6

Figure 21:
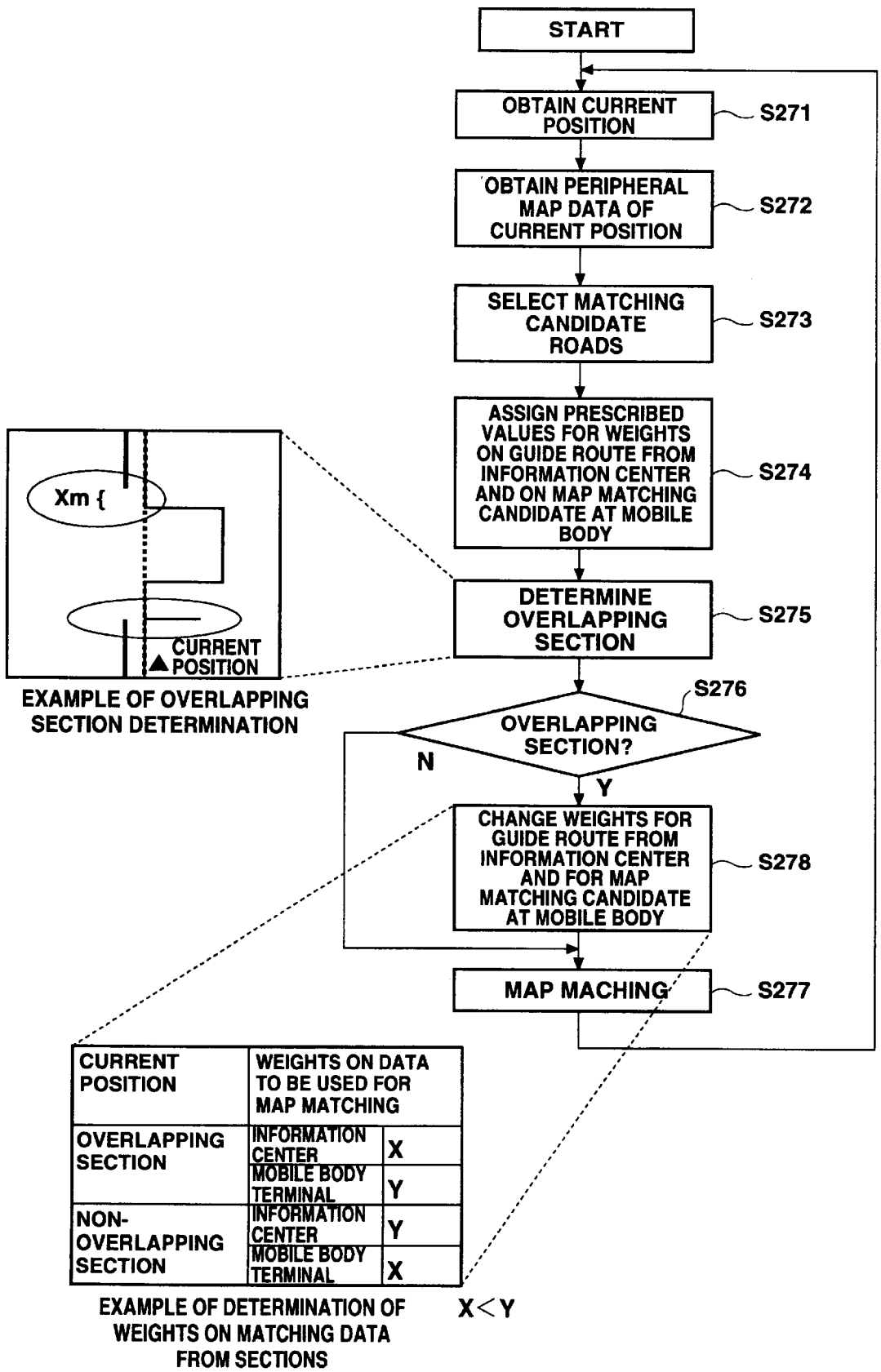
FIG. 21 is a flowchart showing the operation in an example 2-6 of a second embodiment.

FIG. 21 is a flowchart showing an operation of the current position calculating section 12a in an example 2-6. In this example, weights to the guide route data from the information center and to the map data at the mobile body terminal are changed for map matching, in addition to the addition or switching of the matching candidates.

First, the current position is obtained from the current position detecting section 20 (step S271), and map data around the current position is obtained from the map data storing section 14 (step S272). Map matching candidate roads are selected from the obtained map data (step S273).

Weights of prescribed value are set for the guide route from the information center and the map matching candidate at the mobile body (step S274). The prescribed value is pre-stored by the system, and is a value determined unequivocally by, for example, relation to the current position. An overlapping section is then determined (step S275). The determination of the overlapping section is equivalent to the one described in example 1, and thus, it is preferable to regard a portion in the overlapping section near the non-overlapping section as a non-overlapping section.

When the determination of the overlapping section is completed, it is judged whether or not the portion where the map matching is to be applied is within the overlapping section (step S276). If it is within the overlapping section, map matching is executed (step S277), and if it is not, the weights are changed (step S278). In other words, the weight for the guide route from the information center at the overlapping section is changed to, for example, zero (or a small value close to zero). Particularly, the weight can be freely changed according to the conditions, and it is therefore also preferable to change the weight linearly based on a judgement on how much the conditions should be considered.

By changing the weights in this manner, current position can be specified accurately even in cases where the mobile body goes off the guide route and where the mobile body proceeds into a non-overlapping section.

It is also possible to determine the map matching candidate by the user input or setting. In this manner, the reduction in processing load of the CPU and due to the map matching process can be adjusted to suit the user's preferences.

What is claimed is:

1. A navigation device mounted on a mobile body for executing route guidance, said navigation device comprising:
   a mobile body route searching device for conducting a route search using a map database maintained thereon, to obtain route guiding data;
   an information center route searching device for also conducting a route search to obtain route guiding data from an information center using wireless communication; and
   a search selecting device that determines which device to use for obtaining route data before route search by the mobile body route searching device and obtaining route guiding data by the information center route searching device are executed, wherein the mobile body route searching device obtains initial route guiding data with no communication with the information center.

2. A device according to claim 1, wherein,
   said search selecting device determines whether to use said mobile body route searching device or to use said information center route searching device according to a condition on an optimal route for the route search.

3. A device according to claim 1, wherein:
   route searching is conducted for a plurality of conditions on an optimal route and said search selecting device determines a route searching device for each of said plurality of conditions.

4. A device according to claim 1, wherein,
   said route searches include at least a peripheral route search for returning to a set route when off-route, in addition to a complete route search for searching routes to the destination, and said search selecting device determines the route searching device according to the type of search.

5. A device according to claim 1, wherein,
   said search selecting device determines the route searching device to be used based on the version of map data in a map database maintained at said navigation device.

6. A device according to claim 1, wherein,
   said search selecting device determines the route searching device to be used based on the generation date of map data in a map database maintained at said navigation device.

7. A device according to claim 1, wherein,
   said search selecting device selects route searching device by dividing the route search to the destination into two sections, one near the current position and the other far from the current position.

8. A device according to claim 1, wherein,
   said search selecting device determines the route searching device to be used using operation schedule information of the information center.

9. A device according to claim 1, wherein,
   said search selecting device determines route search location based on a reception condition of electric waves.

10. A device according to claim 1, wherein,
    said search selecting device predicts the future time period in which communication with the information center is possible, from information on areas where communication is possible and travel condition of the mobile body, and determines a route searching device to be used considering the predicted time period.

11. A device according to claim 1, wherein,
    said search selecting device determines route searching device to be used considering the usage condition of the communication with the information center.

12. A device according to claim 1, wherein,
    said search selecting device determines a route searching device to be used considering the past travel history of the mobile body.

13. A device according to claim 1, further comprising,
    a point memory for pre-storing destination candidates, wherein,
    said search selecting device selects the route searching device considering the destination candidates stored in said point memory.

14. A device according to claim 1, wherein,
    said search selecting device selects a route searching device considering communications cost within a past time period having predetermined length.

15. A navigation device mounted on a mobile body for executing route guidance, said navigation device comprising:
    a mobile body route searching device for conduction route search using a map database maintained thereon, to obtain route guiding data;
    an information center route searching device for obtaining route guiding data from an information center using wireless communication;
    a search selecting device for determining whether to use said mobile body route searching device or to use said information center route searching device; and a display device for displaying a search result, wherein said search selecting device selects both a mobile body route searching device and an information center route searching device and displays both search results from both devices by overlapping on the same display device.

16. A navigation device mounted on a mobile body for executing route guidance, said navigation device comprising:

a position detecting device for detecting a position of said mobile body;

a mobile body terminal for conducting a route search using a map database containing map data maintained thereon, to obtain route data;

a center route data obtaining device for also conducting a route search to obtain different route data from an information center using wireless communication, and a map matching device for comparing said detected mobile body position and said different route data obtained from said information center to compensate for the detected position of the mobile body relative to said different route data, wherein the mobile body terminal obtains initial route guiding data with no communication with the center route data obtaining device.

17. A device according to claim 16, wherein, said map matching device adds said route data from said information center to map matching candidates in the map data maintained at said mobile body and executes map matching.

18. A device according to claim 17, wherein, said map matching device considers a version of the map data maintained at the mobile body terminal when judging whether to add route data obtained from the information center as a map matching candidate.

19. A device according to claim 17, wherein, said map matching device considers the date when the map data maintained at the mobile body terminal is generated when judging whether to add route data obtained from the information center as a map matching candidate.

20. A device according to claim 17, wherein, said map matching device decides whether to add route data obtained from the information center as a candidate based on the past travel history of the mobile body in sections where said route data and map data maintained at the mobile body terminal do not overlap.

21. A device according to claim 17, wherein, said map matching device decides whether to add route data as a map matching candidate considering a history of travel with route data obtained.

22. A device according to claim 17, wherein, said map matching device is capable of changing weights for roads on the map data and on route data when executing the map matching process with said route data added as a map matching candidate.

23. A navigation device mounted on a mobile body for executing route guidance, said navigation device comprising:

a position detecting device for detecting a position of said mobile body;

a mobile body terminal for conducting route search using a map database containing map data maintained thereon, to obtain route data;

a center route data obtaining device for obtaining route data from an information center using wireless communication; and a map matching device for comparing said detected mobile body position and said route data obtained from said information center to compensate the position of the mobile body, wherein said map matching device compares route data obtained from the information center and map data maintained at the mobile body terminal and executes map matching using only said map data maintained at the mobile body terminal when route data overlaps on a road.

24. A navigation device mounted on a mobile body for executing route guidance, said navigation device comprising:

a position detecting device for detecting a position of said mobile body;

a mobile body terminal for conducting route search using a map database containing map data maintained thereon, to obtain route data;

a center route data obtaining device for obtaining route data from an information center using wireless communication; and a map matching device for comparing said detected mobile data position and said route data obtained from said information center to compensate the position of the mobile body, wherein said map matching device normally executes a map matching process using map data maintained at the mobile body except when a detected position of the mobile body is off the roads on the map data, in which case route guiding data obtained from the information center is added as a map matching candidate and the map matching process is executed.

25. A navigation method for executing route guide at a mobile body, comprising the steps of:

selecting use of at least one of route guiding data obtained by conducting a mobile body route search using a map database maintained at said mobile body and route guiding data obtained by conducting a route search at an information center using wireless communication before a route search is conducted;

subsequently executing the selected route search; and obtaining initial route guiding data by using the map database maintained at the mobile body with no communication with the information center.

* * * * *